(12) United States Patent
Lee et al.

(10) Patent No.: US 12,247,564 B2
(45) Date of Patent: Mar. 11, 2025

(54) GAS SUPPLY PUMP FOR SHIP DUAL FUEL ENGINE

(71) Applicant: Hyundai Heavy Industries Co., Ltd., Ulsan (KR)

(72) Inventors: Sang Don Lee, Ulsan (KR); Chang Ha Lee, Ulsan (KR); Tae Hyung Park, Ulsan (KR); Tae Soo Kim, Ulsan (KR); Young Seok Song, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 0 days.

(21) Appl. No.: 17/927,431

(22) PCT Filed: May 27, 2021

(86) PCT No.: PCT/KR2021/006580
§ 371 (c)(1),
(2) Date: Nov. 23, 2022

(87) PCT Pub. No.: WO2021/246712
PCT Pub. Date: Dec. 9, 2021

(65) Prior Publication Data
US 2023/0220838 A1    Jul. 13, 2023

(30) Foreign Application Priority Data

Jun. 3, 2020   (KR) .................. 10-2020-0066828
Dec. 28, 2020  (KR) .................. 10-2020-0184128
(Continued)

(51) Int. Cl.
*F04B 9/04*    (2006.01)
*F02M 21/02*   (2006.01)
(Continued)

(52) U.S. Cl.
CPC ....... *F04B 9/1176* (2013.01); *F02M 21/0245* (2013.01); *F04B 9/042* (2013.01);
(Continued)

(58) Field of Classification Search
CPC ... F04B 9/04–045; F04B 49/02; F04B 49/125
See application file for complete search history.

(56) References Cited

U.S. PATENT DOCUMENTS 4,195,610 A * 4/1980 Bastenhof ............ F02M 63/021
                                                    123/332
4,556,371 A * 12/1985 Post .................... F04B 11/0066
                                                    417/539
(Continued)

FOREIGN PATENT DOCUMENTS

DE    101 41 178 A1   5/2002
EP    0 976 926 A2    2/2000
(Continued)

*Primary Examiner* — Thomas Fink
(74) *Attorney, Agent, or Firm* — Blank Rome LLP

(57) ABSTRACT

The present invention relates to a gas supply pump comprising: a camshaft which can be rotated; a plurality of cam noses provided at regular intervals in a lengthwise direction of the camshaft and having an eccentric shape from the center of the camshaft; a cam roller provided to be in close contact with each cam nose; and a drive shaft and a piston provided to neighbor with one side of the cam roller; and a liquefied gas compression device which pressurizes and exhausts a liquefied gas according to a straight reciprocation of the piston.

19 Claims, 29 Drawing Sheets

(30) Foreign Application Priority Data

| Dec. 28, 2020 | (KR) | 10-2020-0184129 |
| --- | --- | --- |
| Dec. 28, 2020 | (KR) | 10-2020-0184130 |
| Dec. 28, 2020 | (KR) | 10-2020-0184141 |
| Dec. 28, 2020 | (KR) | 10-2020-0184142 |
| Dec. 28, 2020 | (KR) | 10-2020-0184360 |
| Dec. 28, 2020 | (KR) | 10-2020-0184361 |
| Dec. 28, 2020 | (KR) | 10-2020-0184394 |
| Dec. 30, 2020 | (KR) | 10-2020-0188105 |

(51) Int. Cl.
    *F04B 9/117*      (2006.01)
    *F04B 23/10*      (2006.01)
    *F04B 53/18*      (2006.01)
    *F04B 15/08*      (2006.01)

(52) U.S. Cl.
    CPC ............ *F04B 23/103* (2013.01); *F04B 53/18* (2013.01); *F04B 2015/081* (2013.01)

(56) References Cited

U.S. PATENT DOCUMENTS

| 9,494,115 | B2 * | 11/2016 | Devine | F01L 1/047 |
| --- | --- | --- | --- | --- |
| 2015/0369228 | A1 | 12/2015 | Kounosu et al. | |
| 2017/0146010 | A1 | 5/2017 | Coleman et al. | |
| 2018/0087492 | A1 | 3/2018 | Powell | |

FOREIGN PATENT DOCUMENTS

| EP | 2 761 163 B1 | 7/2015 | | |
| --- | --- | --- | --- | --- |
| GB | 1 559 365 A | 1/1980 | | |
| JP | S47-4646 | 2/1972 | | |
| JP | S59 65557 A | 4/1984 | | |
| JP | 2000-64926 | 3/2000 | | |
| JP | 2015-124670 A | 7/2015 | | |
| KR | 20-0107197 Y1 | 6/1995 | | |
| KR | 10-2011-0094815 A | 8/2011 | | |
| KR | 10-2013-0039032 A | 4/2013 | | |
| KR | 10-2018-0093403 A | 8/2018 | | |
| WO | WO-2007014466 A1 * | 2/2007 | ............. | F04B 25/00 |
| WO | WO-2011146125 A2 * | 11/2011 | ............. | F01B 29/00 |

* cited by examiner

GAS SUPPLY PUMP FOR SHIP DUAL FUEL ENGINE

TECHNICAL FIELD

The present disclosure relates to a gas supply pump for a ship dual fuel engine, and more particularly, to a gas supply pump for a ship dual fuel engine for enabling independent cylinder operation.

BACKGROUND ART

A dual fuel engine employed in ship uses natural gas and heavy oil as a fuel source. A fuel gas supply system (FGSS) is designed to supply liquefied gas to the dual fuel engine. Accordingly, the high pressure gas injection type dual fuel engine essentially requires a high pressure pump for FGSS to supply high pressure gas.

For example, the high pressure pump for FGSS as disclosed by Korean Patent Publication No. 2018-0093403 typically includes a plurality of cylinders for one crankshaft, wherein a connecting rod and a piston mounted in each cylinder are operated to compress/discharge high pressure fuel by the reciprocating motion in the cylinder. However, in the case of this type high pressure pump, since the connecting rod and the piston are structurally connected to the crankshaft, it fails to selectively control the operation of the connecting rod and the piston mounted in the cylinder. Accordingly, to check or inspect any error in the high pressure pump, it is necessary to install an extra high pressure pump.

As described above, since it is necessary to install the high pressure pump for operation and the extra high pressure pump in FGSS, it requires a space for installing the two high pressure pumps and an additional cost to install the two high pressure pumps.

TECHNICAL PROBLEM

The present disclosure is designed to solve the above-described problem, and therefore the present disclosure is directed to providing a gas supply pump for a ship dual fuel engine for enabling independent cylinder operation.

TECHNICAL SOLUTION

To achieve the above-described objective, a gas supply pump for a ship dual fuel engine according to the present disclosure includes a rotatable camshaft; a plurality of cam noses arranged at regular intervals along a lengthwise direction of the camshaft, wherein the cam noses are eccentric from a center of the camshaft; a cam roller in close contact with each cam nose; a drive shaft and a piston adjacent to each other on one side of the cam roller; and a liquefied gas compression device to compress and discharge liquefied gas by a linear reciprocating motion of the piston, wherein as the camshaft rotates, when the cam nose moves in a compression direction of the piston, the piston is compressed, and when the cam nose moves in a decompression direction of the piston, the piston is decompressed, and the cam roller is selectively spaced apart from the cam nose, and when the cam roller and the cam nose are spaced apart from each other, a rotational driving force of the cam nose is not transmitted to the piston.

A plurality of the drive shafts are arranged side by side in a direction perpendicular to one camshaft, and the cam roller is disposed between the cam nose and the drive shaft of the camshaft.

A center of rotation of the cam nose is the same as a center of rotation of the camshaft, a radius of the cam nose is smaller than a radius of the camshaft, a radius of rotation of the cam nose corresponds to a radius of rotation of the camshaft, and when the camshaft rotates, the cam roller in close contact with the cam nose makes a linear reciprocating motion within a predetermined distance.

When the cam nose is located at a 90° angle on the basis of a vertical direction by the rotation of the camshaft, the cam roller moves the compression direction of the piston, and when the cam nose is located at a 270° angle by the rotation of the camshaft, the cam roller moves in the decompression direction of the piston.

The gas supply pump for a ship dual fuel engine further includes an integral connection member to integrally connect the cam roller and the drive shaft, wherein the cam roller is seated at one end of the integral connection member, the drive shaft is mounted at the other end, and a compression spring disposed around the drive shaft is fixed to an inner side of the integral connection member, and when the camshaft rotates, the cam roller and the drive shaft in close contact with the cam nose make a linear reciprocating motion together with the integral connection member.

A first seating portion and a second seating portion which form a predetermined space at one end of the drive shaft are provided at a coupled part of the drive shaft and the piston, the first seating portion is disposed in an inner direction of the drive shaft, the second seating portion is disposed in an outer direction of the drive shaft, an inertia moment damping member is disposed in the first seating portion, and one exposed surface of the inertia moment damping member is in close contact with the piston.

One surface of the inertia moment damping member in close contact with the piston has a convex surface shape with a radius of curvature, and when the moment of inertia of the camshaft is applied to the drive shaft, the moment of inertia applied to the drive shaft is allowed to spread out by the convex surface of the inertia moment damping member.

A diameter of the second seating portion is larger than a diameter of the first seating portion, the diameter of the first seating portion corresponds to a diameter of the piston, and a stopper is filled between a space between the second seating portion and the piston and is in close contact with the piston and an inner diameter of the second seating portion to prevent the piston from rotating.

A clamp may be provided at the coupled part of the drive shaft and the piston to protect the corresponding coupled part.

The liquefied gas compression device includes a liquefied gas supply passage in which the liquefied gas to be compressed is supplied to a suction valve, the suction valve configured to suck the liquefied gas from the liquefied gas supply passage and supply the sucked liquefied gas to a discharge valve when pressure of the piston is applied, and the discharge valve configured to discharge the liquefied gas supplied from the suction valve in a compressed state.

One end of the liquefied gas supply passage is connected to a liquefied gas supply port on one side of the gas supply pump, the other end is connected to a liquefied gas inlet port on one side of the suction valve, and the liquefied gas to be compressed is supplied to an internal space of the suction valve through the liquefied gas inlet port via the liquefied gas supply port and the liquefied gas supply passage.

An opening/closing member is provided around the suction valve to selectively open/close the liquefied gas inlet port, the opening/closing member is connected to a spring member around a bottom circumference of the suction valve and makes a linear reciprocating motion by compression and restoration of the spring member, when the opening/closing member moves in the compression direction by the compression of the spring member, the liquefied gas inlet port is opened, when the opening/closing member moves in the restoration direction by the restoration of the spring member, the liquefied gas inlet port is closed, and when the liquefied gas is supplied through the liquefied gas supply passage with the liquefied gas inlet port closed by the opening/closing member, the opening/closing member moves in the compression direction of the spring member by supply pressure of the liquefied gas, the liquefied gas inlet port is opened, and accordingly, the liquefied gas is supplied to the internal space of the suction valve.

The discharge valve is disposed in a discharge chamber, a spring member is provided at a lower end of the discharge valve and allows the discharge valve to make a linear reciprocating motion by compression and restoration of the spring member, an auxiliary chamber of a predetermined space is provided around a top circumference of the discharge chamber, a discharge inlet pipe is provided between the auxiliary chamber and the discharge valve, and the liquefied gas discharged from the suction valve is supplied to the discharge valve via the auxiliary chamber and the discharge inlet pipe in a sequential order.

The discharge valve is configured to close a suction valve outlet pipe when the spring member is restored, when the discharge valve moves in the compression direction of the spring member, a space is formed on top of the discharge chamber, and the suction valve outlet pipe is opened, when the space is formed on top of the discharge chamber by the movement of the discharge valve, the space on top of the discharge chamber is spatially connected to the suction valve outlet pipe and is also connected to the auxiliary chamber, and the liquefied gas discharged through the suction valve outlet pipe is supplied to the internal space of the discharge chamber via the auxiliary chamber and the discharge inlet pipe through the space on top of the discharge chamber.

When the liquefied gas is discharged through the suction valve, since the operating pressure of the piston is much higher than the supply pressure of the liquefied gas supplied to the liquefied gas supply passage, the liquefied gas inlet port is closed by the opening/closing member.

The gas supply pump for a ship dual fuel engine further includes a cam roller-drive shaft case on an outer side of the integral connection member to protect the integral connection member and guide the movement of the integral connection member, wherein the cam roller-drive shaft case has, on one side, a cutoff bolt through-hole into which a cutoff bolt is inserted and passed through, the integral connection member has, on one side, a cutoff bolt insertion groove, into which the cutoff bolt is inserted to a predetermined depth, and the cam nose and the cam roller are induced to be spaced apart from each other by inserting the cutoff bolt into the cutoff bolt insertion groove through the cutoff bolt through-hole.

A center of the cutoff bolt through-hole and a center of the cutoff bolt insertion groove are offset each other, and on the basis of the piston being perpendicular to the camshaft, the center of the cutoff bolt insertion groove is located at a slightly lower position than the center of the cutoff bolt through-hole, and the cutoff bolt insertion groove has a tapered shape having a decreasing radius with increasing depth, and has a difference 'd' between radii at an entrance and a lower surface of the cutoff bolt insertion groove by the tapered shape.

In the insertion of the cutoff bolt passing through the cutoff bolt through-hole into the cutoff bolt insertion groove, the cutoff bolt contacts a side of the cutoff bolt insertion groove having a tapered shape and moves inward of the cutoff bolt insertion groove along the side of the cutoff bolt insertion groove, and as the cutoff bolt moves inward of the cutoff bolt insertion groove, the integral connection member having the cutoff bolt insertion groove moves up, and the cam roller is spaced apart from the cam nose.

When one end of the cutoff bolt contacts the lower surface of the cutoff bolt insertion groove, the integral connection member moves up by the difference 'd' between the radii at the entrance and the lower surface of the cutoff bolt insertion groove, and the cam roller and the cam nose are spaced apart from each other by the length 'd'.

The gas supply pump for a ship dual fuel engine further includes a cam roller-drive shaft case on an outer side of the integral connection member to protect the integral connection member and guide the movement of the integral connection member, wherein a hollow cylindrical cutoff pin guide member is provided on one side of the cam roller-drive shaft case, the cutoff pin is inserted into the cutoff pin guide member such that the cutoff pin can move up or down, the cutoff pin guide member has a cutoff pin guide groove on one side, the cutoff pin guide groove includes a vertical guide groove and a horizontal guide groove spatially connected to each other, the vertical guide groove is extended from a first point to a second point on a vertical line, the horizontal guide groove is extended from the second point of the vertical guide groove to a third point in a horizontal direction, a cutoff pin guide pin is provided on one side of the cutoff pin and is disposed in the cutoff pin guide groove, when the cutoff pin guide pin vertically moves from the first point of the cutoff pin guide groove to the second point, the cutoff pin moves down by a corresponding distance, when the cutoff pin guide pin horizontally moves from the second point of the cutoff pin guide groove to the third point, the cutoff pin rotates by an angle between the second point and the third point, the cutoff pin has, on a lower surface, a cylindrical cam roller spacing protrusion having a smaller radius than the cutoff pin, a center of the cam roller spacing protrusion is eccentric from a center of a circle of the cutoff pin, and when the cutoff pin guide pin horizontally moves from the second point of the cutoff pin guide groove to the third point, the cam roller spacing protrusion on the lower surface of the cutoff pin rotates at a predetermined angle.

The cam roller-drive shaft case has, on one side, a cutoff pin through-hole into which the cutoff pin is inserted and passed through, the integral connection member has a cam roller spacing guide groove corresponding to the cutoff pin through-hole, when the cutoff pin guide pin is located at the second point, the cam roller spacing protrusion at the lower end of the cutoff pin is disposed in the cam roller spacing guide groove of the integral connection member, the cam roller spacing protrusion is in non-contact with the integral connection member in the cam roller spacing guide groove, when the cutoff pin protrusion moves from the second point of the cutoff pin guide groove to the third point, the cutoff pin horizontally rotates, and the cam roller spacing protrusion horizontally rotates and physically pushes and moves the integral connection member, and the cam roller and the cam nose are spaced apart from each other by the movement of the integral connection member by the cam roller spacing protrusion.

The gas supply pump for a ship dual fuel engine further includes a coupling case at a coupled part of the drive shaft and the piston; a rack member connected to the drive shaft, or connected and fixed to both the drive shaft and the piston in an internal space of the coupling case; a pinion engaged with a teeth-shaped rack on an outer surface of the rack member; and a pinion guide member on the other side of the pinion to transmit the driving force to the pinion, wherein when the pinion guide member moves down, the pinion rotates in a counterclockwise direction, the rack member connected to the drive shaft moves up by the counterclockwise rotation of the pinion, and the cam nose and the cam roller are spaced apart from each other by the upward movement of the rack member.

The pinion guide member may make a reciprocating motion by a hydraulic cylinder.

The gas supply pump for a ship dual fuel engine further includes a pressure chamber between the drive shaft and the piston to selectively apply a driving force of the drive shaft to the piston, wherein an amount of the liquefied gas discharged from the liquefied gas compression device is controlled by adjusting an amount of lubricating oil in the pressure chamber.

A first surface of the pressure chamber contacts the drive shaft, a second surface of the pressure chamber contacts the piston, the first surface of the pressure chamber can move by the driving force of the drive shaft, and the pressure chamber may change in volume by the movement of the first surface.

In case that the pressure chamber is fully filled with the lubricating oil, when the driving force of the drive shaft is applied to the first surface of the pressure chamber, the driving force of the drive shaft is applied to the piston via the lubricating oil filled in the pressure chamber, and the pressure of the piston is transmitted to the liquefied gas compression device and the discharge of the liquefied gas is performed.

In case that there is no lubricating oil in the pressure chamber, when the driving force of the drive shaft is applied to the first surface of the pressure chamber, since the pressure chamber is an empty space, the first surface of the pressure chamber moves toward the second surface, and when a stroke length of the drive shaft by the operation of the camshaft is smaller than a length between the first surface and the second surface of the pressure chamber, the driving force of the drive shaft is not transmitted to the second surface of the pressure chamber, and the discharge of the liquefied gas by the liquefied gas compression device is not performed.

In case that the pressure chamber is filled with the lubricating oil and the lubricating oil in the pressure chamber can be discharged through a lubricating oil supply passage, when the driving force of the drive shaft is applied to the first surface of the pressure chamber, the lubricating oil in the pressure chamber is discharged, the first surface moves by an amount of the discharged lubricating oil, the driving force is not applied to the piston by a length as much as the amount of discharge of the lubricating oil in the pressure chamber among a total stroke length Ds of the drive shaft, and the piston only moves to a remaining stroke length left after subtracting the length as much as the amount of discharge of the lubricating oil in the pressure chamber from the total stroke length Ds.

The gas supply pump for a ship dual fuel engine may further include a lubricating oil supply passage in which the lubricating oil is supplied to the pressure chamber or discharged from the pressure chamber, and a lubricating oil supply device to set an amount of the lubricating oil supplied to the pressure chamber and an amount of the lubricating oil discharged from the pressure chamber.

ADVANTAGEOUS EFFECTS

The gas supply pump for a ship dual fuel engine according to the present disclosure has the following effects.

It is possible to achieve independent operation control for each cylinder provided in the high pressure pump. Accordingly, there is no need to install an additional pump to check or inspect any error in the specific cylinder.

Additionally, it is possible to minimize the influence of the moment of inertia in the rotational motion of the camshaft on the drive shaft and the piston, and it is possible to effectively compress the liquefied gas and prevent the backflow of the liquefied gas through the liquefied gas compression device including the suction valve and the discharge valve.

Along with this, it is possible to prevent cavitation caused by the introduction of liquefied gas and effectively suppress overheat in the internal space of the cylinder through the optimal sealing structure in the region in which the piston moves.

DETAILED DESCRIPTION OF THE PREFERRED EMBODIMENTS

The present disclosure proposes technology related to a high pressure pump for enabling independent operation of each cylinder. The high pressure pump according to the present disclosure plays a role in supplying high pressure gas to a dual fuel engine, and may be employed in a fuel gas supply system (FGSS) that supplies high pressure gas to the dual fuel engine.

The high pressure pump includes a plurality of cylinders, and injects high pressure gas through each cylinder. It is necessary to check or inspect any error in each cylinder, and when a specific cylinder is out of order or requires inspection, it will be efficient to take action for only the corresponding cylinder and enable the remaining cylinder to normally operate. However, as mentioned in the 'Background Art', the high pressure pump according to the related art includes a plurality of cylinders in one crankshaft wherein a connecting rod and a piston are mounted in each cylinder, failing to achieve independent operation control for each cylinder.

The present disclosure proposes technology to achieve independent operation control for each cylinder provided in the high pressure pump. Specifically, the present disclosure proposes technology to selectively control the operation of each of a plurality of cylinders provided in a camshaft.

Along with this, the present disclosure proposes an optimal coupling structure of drive shaft-piston for minimizing the influence of the moment of inertia of the camshaft on the drive shaft and the piston. Additionally, the present disclosure proposes technology to effectively compress liquefied gas and prevent the backflow of liquefied gas through a liquefied gas compression device including a suction valve and a discharge valve. Furthermore, the present disclosure proposes technology to prevent cavitation caused by the introduction of liquefied gas and effectively suppress overheat in the internal space of the cylinder through an optimal sealing structure in an area in which the piston moves.

Hereinafter, a gas supply pump for a ship dual fuel engine according to an embodiment of the present disclosure will be described in detail with reference to the accompanying drawings.

Figure 1:
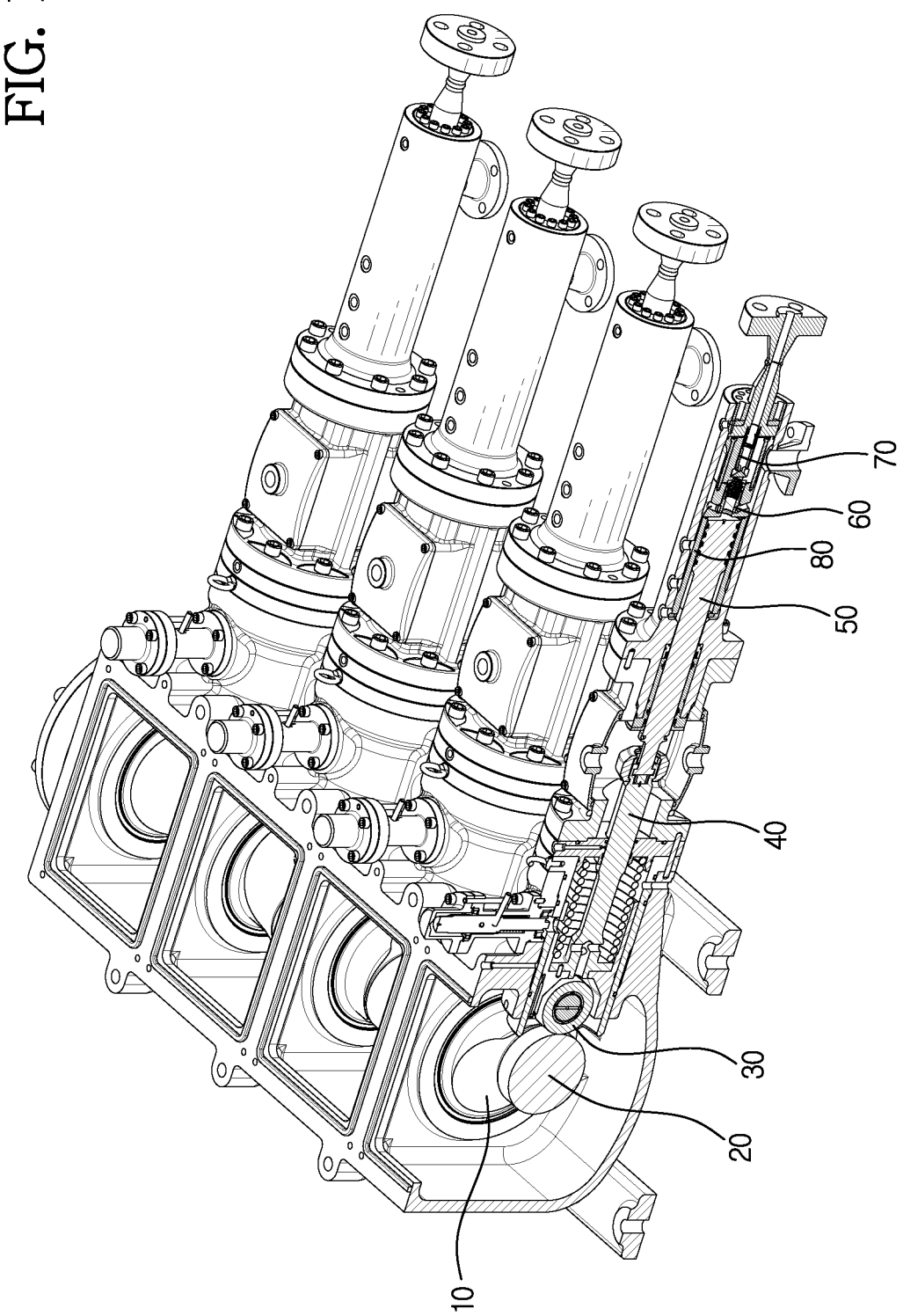
FIG. 1 is a perspective view of a gas supply pump for a ship dual fuel engine according to an embodiment of the present disclosure.
Figure 2:
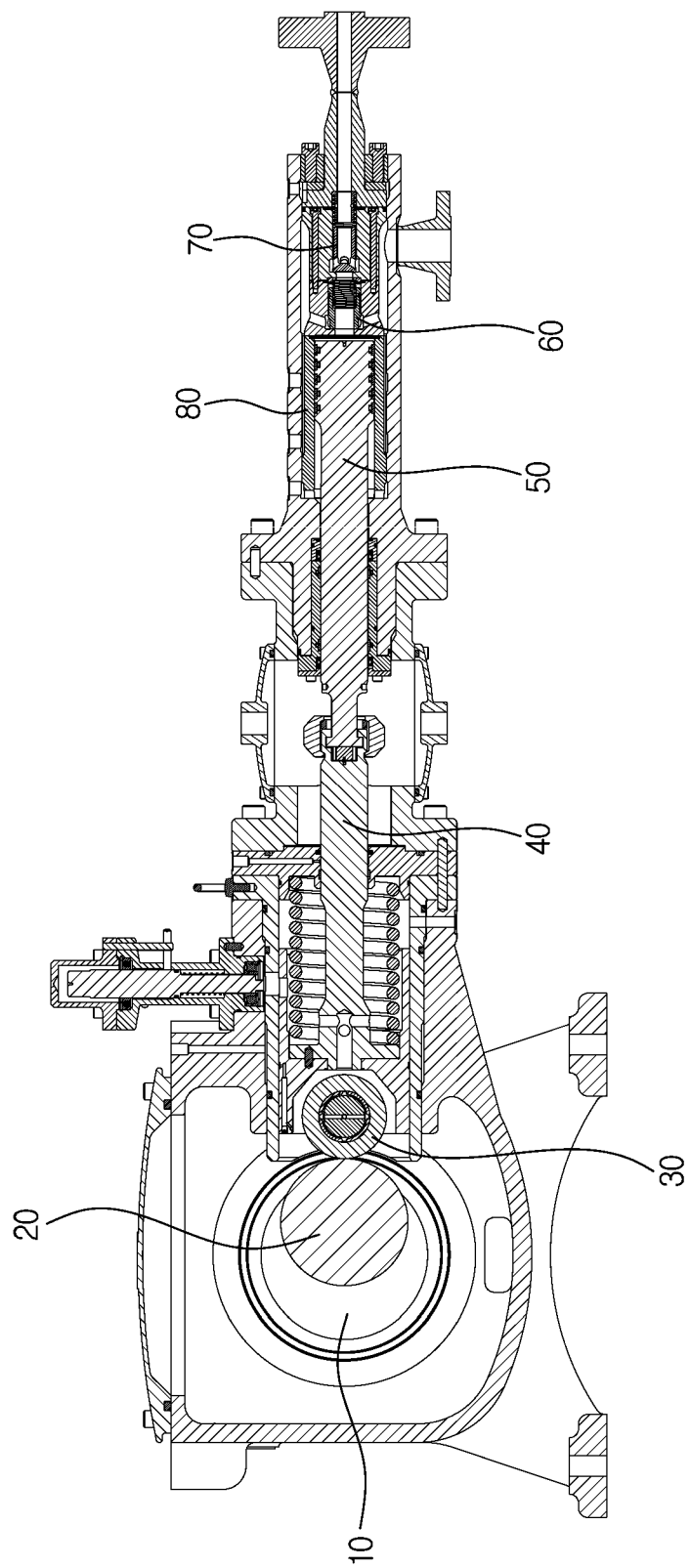
FIG. 2 is a cross-sectional view taken along the line A-A' of FIG. 1.

Referring to FIGS. 1 and 2, the gas supply pump for a ship dual fuel engine according to an embodiment of the present disclosure includes a camshaft, a cam roller 30, a drive shaft 40, a piston 50 and a liquefied gas compression device.

The rotational motion of the camshaft 10 induces a linear reciprocating motion of the drive shaft 40 and the piston 50, and the pressure by the linear reciprocating motion of the piston 50 is applied to the liquefied gas compression device, so liquefied gas is discharged at high pressure by the liquefied gas compression device.

The camshaft 10 rotates by the power of driving means, and a plurality of cam noses 20 are arranged at regular intervals along the lengthwise direction of the camshaft 10. The drive shaft 40 is positioned for each cam nose 20, and the drive shaft 40 is perpendicular to the lengthwise direction of the camshaft 10. The cam roller 30 is between the cam nose 20 and the drive shaft 40. Accordingly, the plurality of drive shafts 40 are arranged side by side in a direction perpendicular to one camshaft 10, and the cam rollers 30 are between the cam noses 20 and the drive shafts 40 of the camshaft 10.

The rotational motion of the camshaft 10 induces the linear reciprocating motion of the drive shaft 40, and this motion can be enabled by the cam nose 20 of the camshaft 10.

It is designed such that the center of rotation of the cam nose 20 is the same as the center of rotation of the camshaft 10, the radius of the cam nose 20 is smaller than the radius of the camshaft 10, and the radius of rotation of the cam nose 20 corresponds to the radius of rotation of the camshaft 10.

The cam roller 30 is in close contact with each cam nose 20 on one side of the cam nose 20. Since the center of rotation of the cam nose 20 is eccentric from the axis of the camshaft and the radius of the cam nose 20 is smaller than the radius of the camshaft 10, when the camshaft 10 rotates, the cam roller 30 on one side of the cam nose 20 makes a linear reciprocating motion within a predetermined distance.

Additionally, the drive shaft 40 and the piston 50 are connected adjacent to each other on one side of the cam roller 30, and when the cam roller 30 makes the linear reciprocating motion, the drive shaft 40 and the piston 50 also make a linear reciprocating motion together.

Figure 3A:
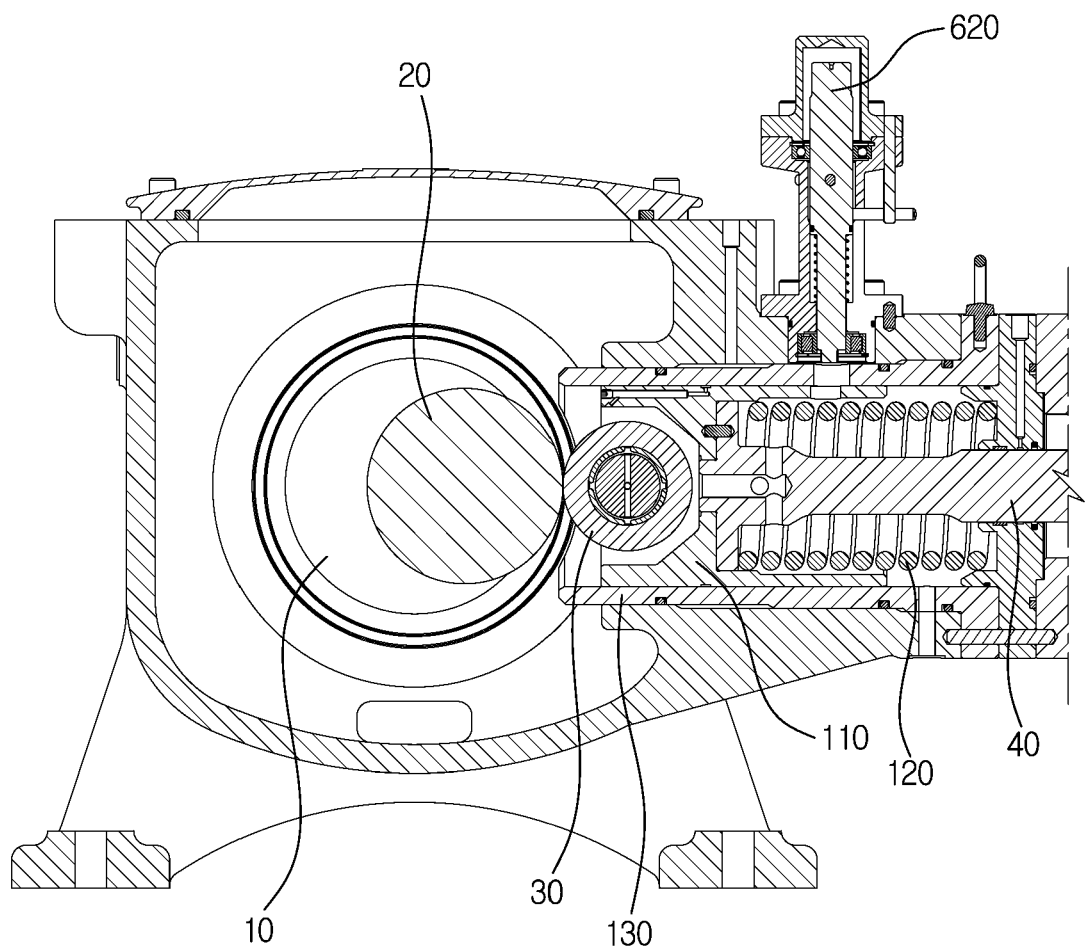
FIGS. 3A and 3B are reference diagrams illustrating a linear reciprocating movement of a cam roller depending on the position of a cam nose.
Figure 3B:
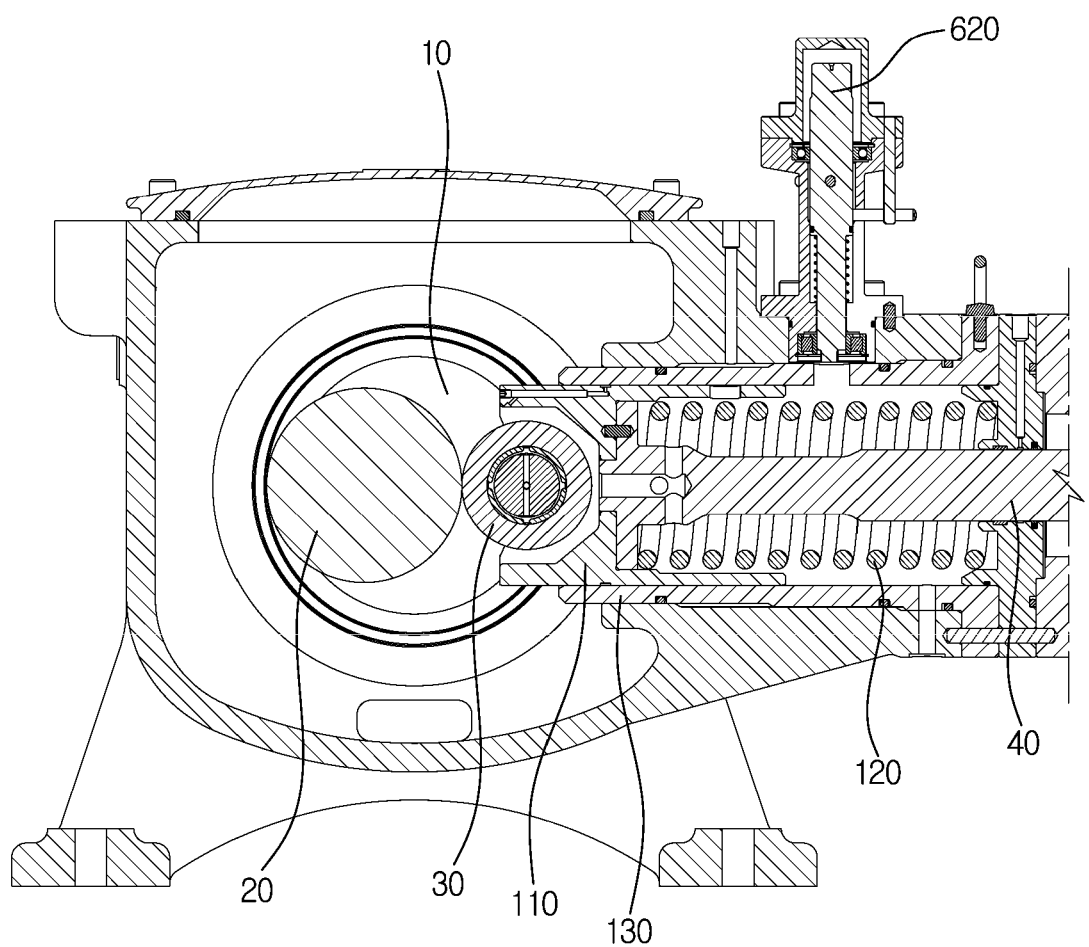

Specifically, as shown in FIG. 3A, when the cam nose 20 is located at 90° angle on the basis of the vertical direction by the rotation of the camshaft 10, the cam roller 30 moves in a compression direction of the piston 50, and as shown in FIG. 3B, when the cam nose 20 is located at 270° angle by the rotation of the camshaft 10, the cam roller 30 moves in a decompression direction of the piston 50. As described above, when the camshaft 10 rotates, the cam roller 30 makes the linear reciprocating motion within the predetermined distance, and the distance of the linear reciprocating motion of the cam roller 30 corresponds to a distance between the cam nose 20 located at 90° angle and the cam nose 20 located at 270° angle. Here, when the cam nose 20 is located at 270° angle, the movement of the cam roller 30 in the decompression direction of the piston 50 is made by a compression spring 120 as described below. Additionally, in the specification, the compression direction of the piston 50 refers to a direction in which the piston 50 moves inward of a cylinder 80, and the decompression direction of the piston 50 refers to a direction in which the piston 50 moves outward of the cylinder 80.

The drive shaft 40 is disposed at one end of the cam roller 30, and the compression spring 120 is disposed around the drive shaft 40. When the cam roller 30 moves in the compression direction of the piston 50, the compression spring 120 is compressed, and when the cam roller 30 moves in the decompression direction of the piston 50, the compression spring 120 is restored to the original state.

The cam roller 30 and the drive shaft 40 are integrally connected by an integral connection member 110, and one end of the compression spring 120 is fixed to the integral connection member 110. Specifically, the integral connection member 110 is hollow, and the cam roller 30 is seated at one end of the integral connection member 110 and the drive shaft 40 is mounted at the other end, and the compression spring 120 disposed around the drive shaft 40 is fixed to the inner side of the integral connection member 110.

As described above, due to the structure in which the cam roller 30, the drive shaft 40 and the integral connection member 110 are integrally connected, when the camshaft 10 rotates, not only the cam roller 30 in close contact with the cam nose 20 but also the drive shaft 40 and the integral connection member 110 make a linear reciprocating motion together, and the compression spring 120 is compressed or restored to the original state by the movement.

Meanwhile, a cam roller-drive shaft case 130 is provided on the outer side of the integral connection member 110. The cam roller-drive shaft case 130 plays a role in protecting the integral connection member 110 and the compression spring 120 from the outdoor environment and guiding the movement of the integral connection member 110 and the compression spring 120.

The drive shaft 40 and the piston 50 are coupled by the following configuration.

Since the piston 50 is a device designed to make a linear reciprocating motion in the cylinder 80, a direction of a force applied to the piston 50 should be accurately consistent with the linear reciprocating motion of the piston 50. When the direction of the force applied to the piston 50 is inconsistent with the linear reciprocating motion direction of the piston 50, this represents a partial loss of the force applied to the piston 50, and further, it hinders the linear reciprocating motion of the piston 50.

Meanwhile, the force applied to the piston 50 is the linear reciprocating motion of the drive shaft 40, and the linear reciprocating motion of the drive shaft 40 is induced by the rotational motion of the camshaft 10. However, during the transformation of the rotational motion of the camshaft 10 into the linear reciprocating motion of the drive shaft 40, the moment of inertia of the camshaft 10 acts on the drive shaft 40 and it may hinder the linear reciprocating motion of the drive shaft 40. The moment of inertia refers to the rotational inertia in the rotational reciprocating motion of the cam/roller, and an inertia moment damping member 230 as described below is provided to prevent the rotational inertia from affecting the reciprocating motion of the piston.

The coupling structure of the drive shaft 40 and the piston 50 according to the present disclosure is designed considering the action of the moment of inertia of the camshaft 10. That is, the drive shaft 40 and the piston 50 have an optimal coupling structure for minimizing the influence of the moment of inertia of the camshaft 10 on the drive shaft 40.

Figure 4:
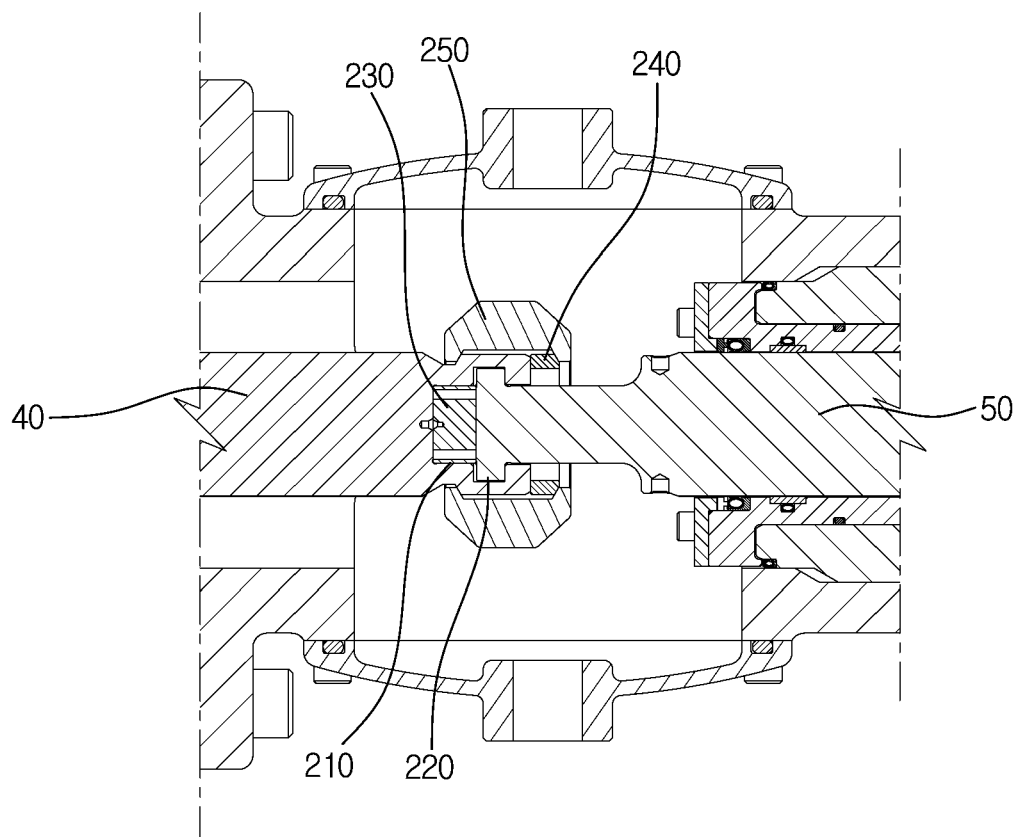
FIG. 4 is a reference diagram showing a coupled part of a drive shaft and a piston.
Figure 5A:
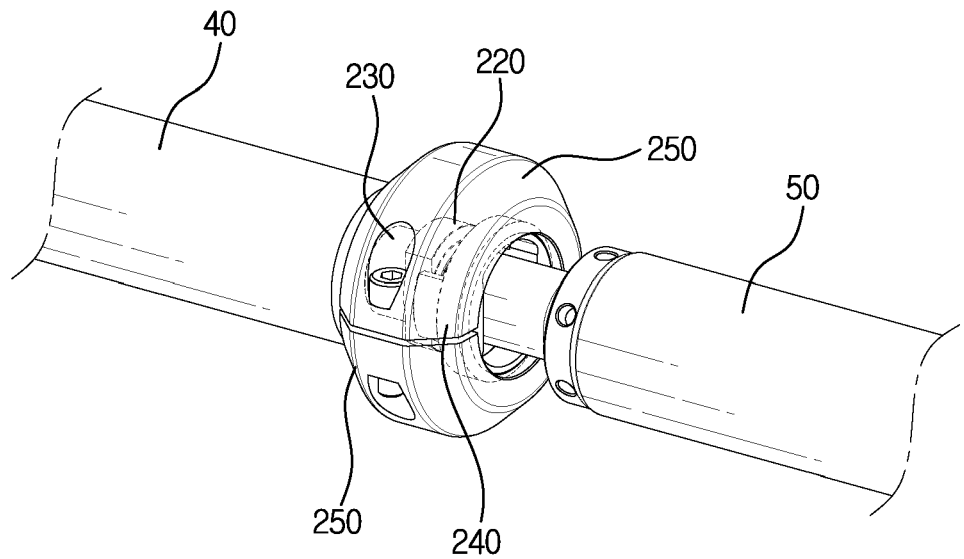
FIGS. 5A and 5B are perspective views showing a coupled part of a drive shaft and a piston.
Figure 5B:
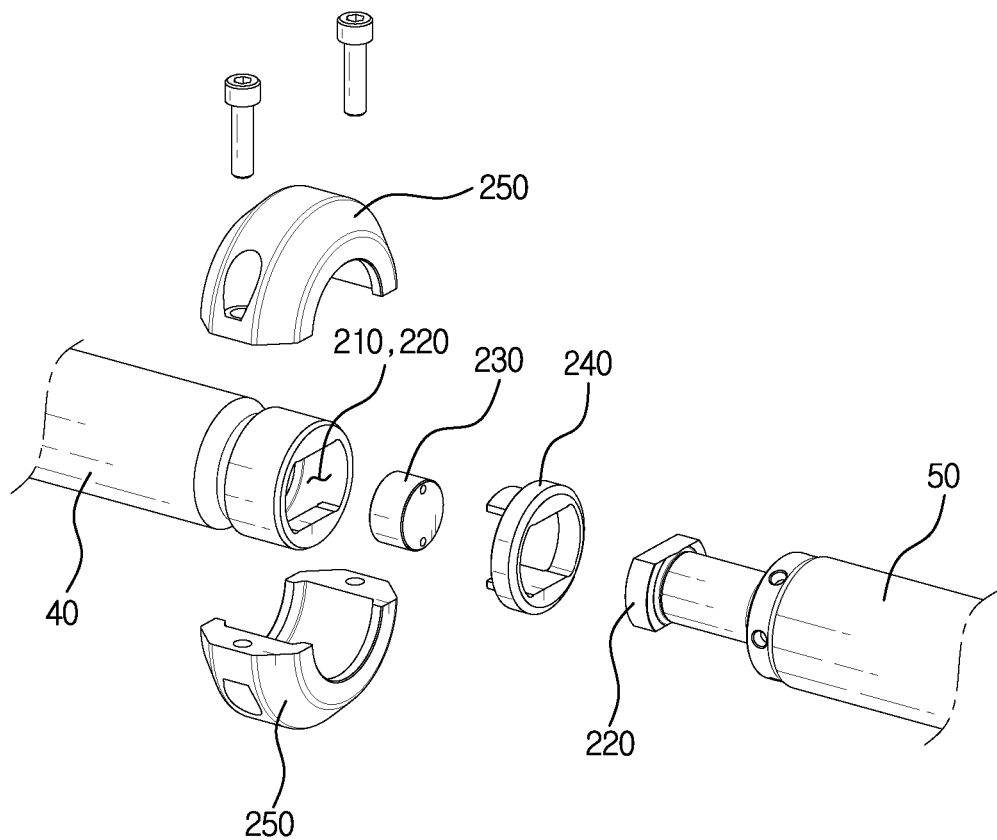

Specifically, referring to FIGS. 4 and 5, a first seating portion 210 and a second seating portion 220 for providing a predetermined space are at one end of the drive shaft 40. The first seating portion 210 is disposed in the inner direction of the drive shaft 40, and the second seating portion 220 is disposed in the outer direction of the drive shaft 40. The diameter of the second seating portion 220 is larger than the diameter of the first seating portion 210, and the diameter of the first seating portion 210 corresponds to the diameter of the piston 50.

The inertia moment damping member 230 is disposed in the first seating portion 210. One exposed surface of the inertia moment damping member 230 comes into close contact with the piston 50. Additionally, one surface of the inertia moment damping member 230 in close contact with the piston 50 has a gentle slope convex surface shape with a large radius of curvature.

The reason why one surface of the inertia moment damping member 230 in close contact with the piston 50 is designed in the gentle slope convex surface shape with a large radius of curvature is to minimize the action of the moment of inertia applied to the drive shaft 40 on the piston 50 when the moment of inertia of the camshaft 10 is applied to the drive shaft 40. Since the moment of inertia applied to the drive shaft 40 is allowed to spread out by the convex surface of the inertia moment damping member 230 prior to being applied to the piston 50, the moment of inertia applied to the piston 50 is minimized.

A stopper 240 is filled between a space between the second seating portion 220 and the piston 50. The stopper 240 is in close contact with the piston 50 and the inner diameter of the second seating portion 220 to prevent the piston 50 from rotating.

Additionally, a clamp 250 may be provided at the coupled part of the drive shaft 40 and the piston 50 to protect the corresponding coupled part. That is, it is possible to protect the coupled part of the drive shaft 40 and the piston 50 from the outdoor environment by fastening two clamp 250 members with bolts.

The piston 50 makes the linear reciprocating motion in the cylinder 80, and the pressure is applied to the liquefied gas compression device by the linear reciprocating motion of the piston 50. The liquefied gas compression device is a device that discharges the liquefied gas at high pressure using the pressure applied by the piston 50.

Figure 6:
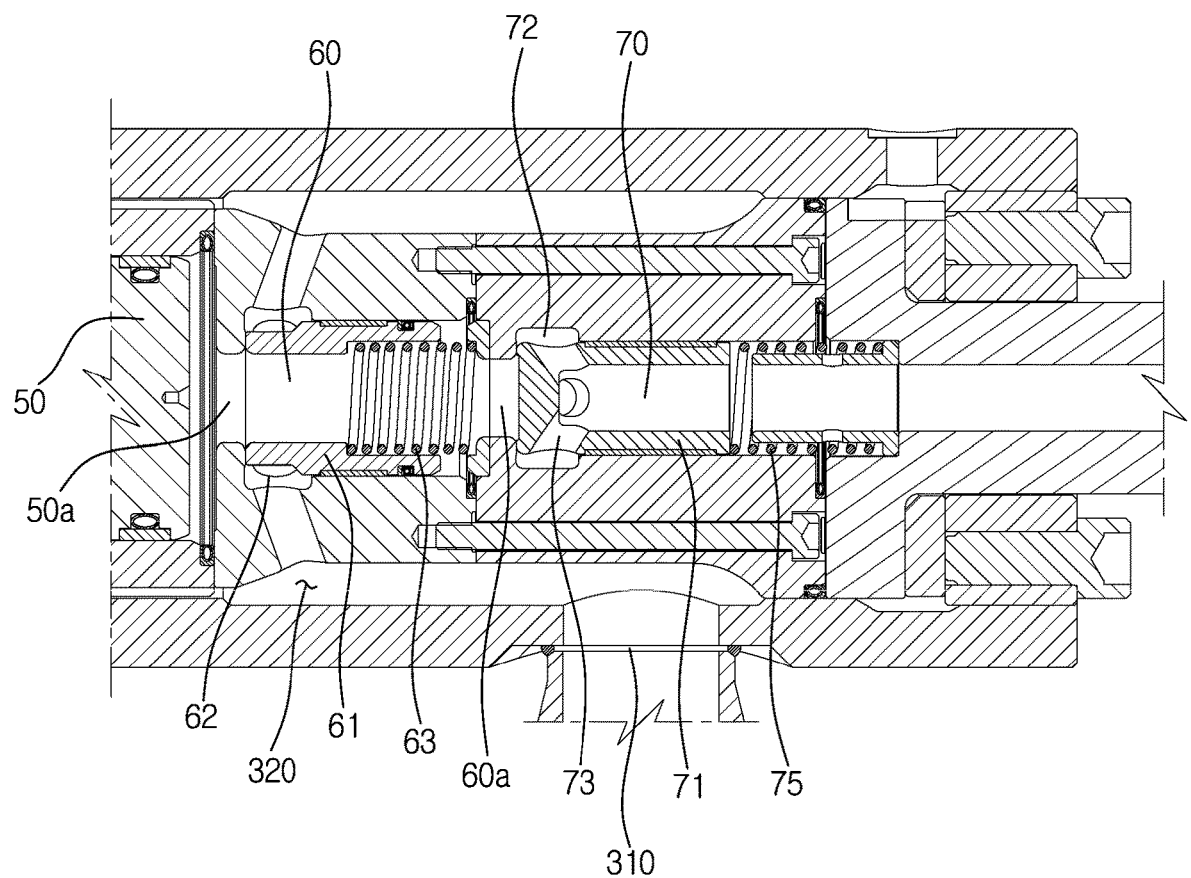
FIG. 6 is a configuration diagram of a liquefied gas compression device.
Figure 7:
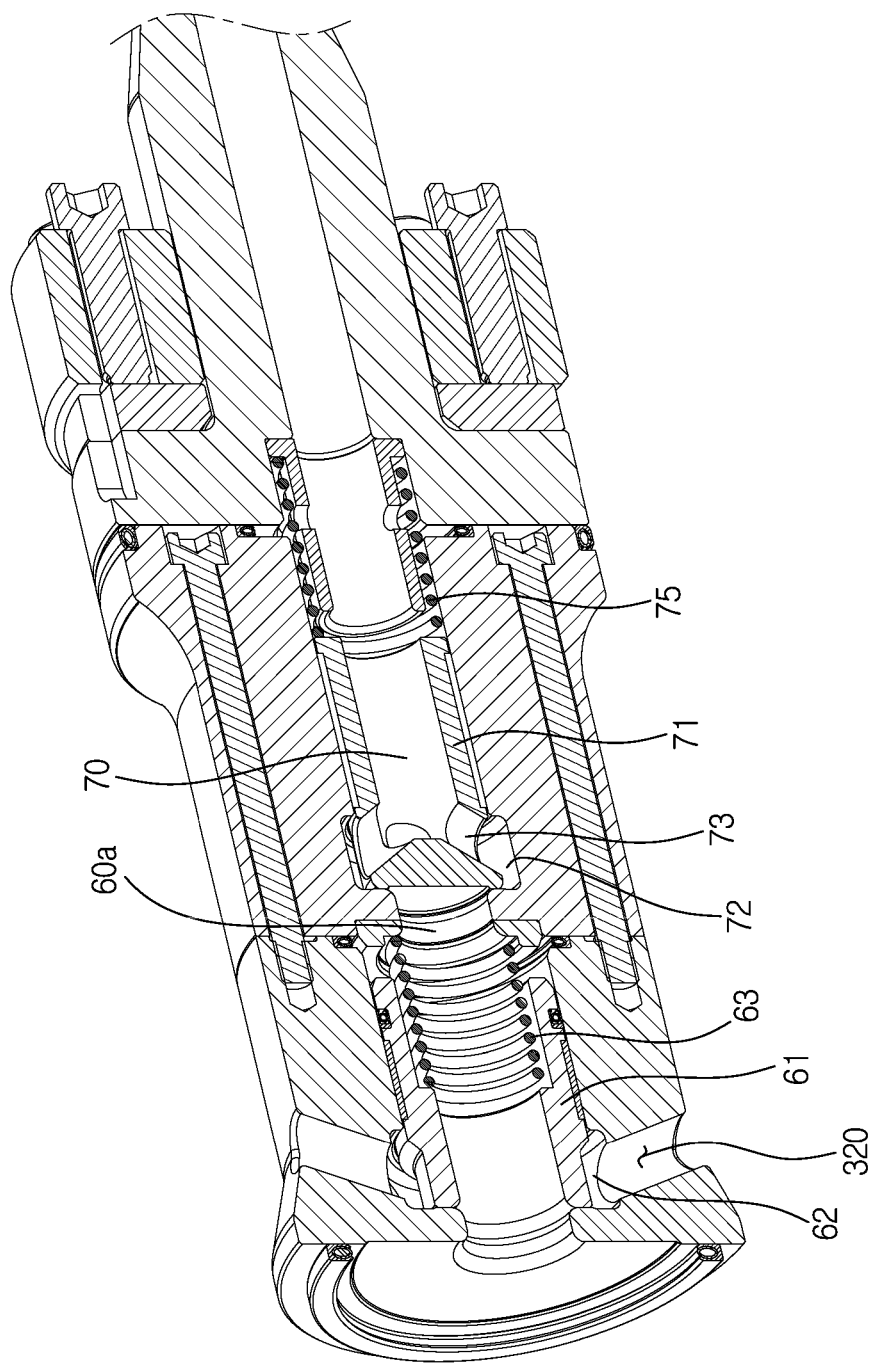
FIG. 7 is a perspective view of a liquefied gas compression device.
Figure 8:
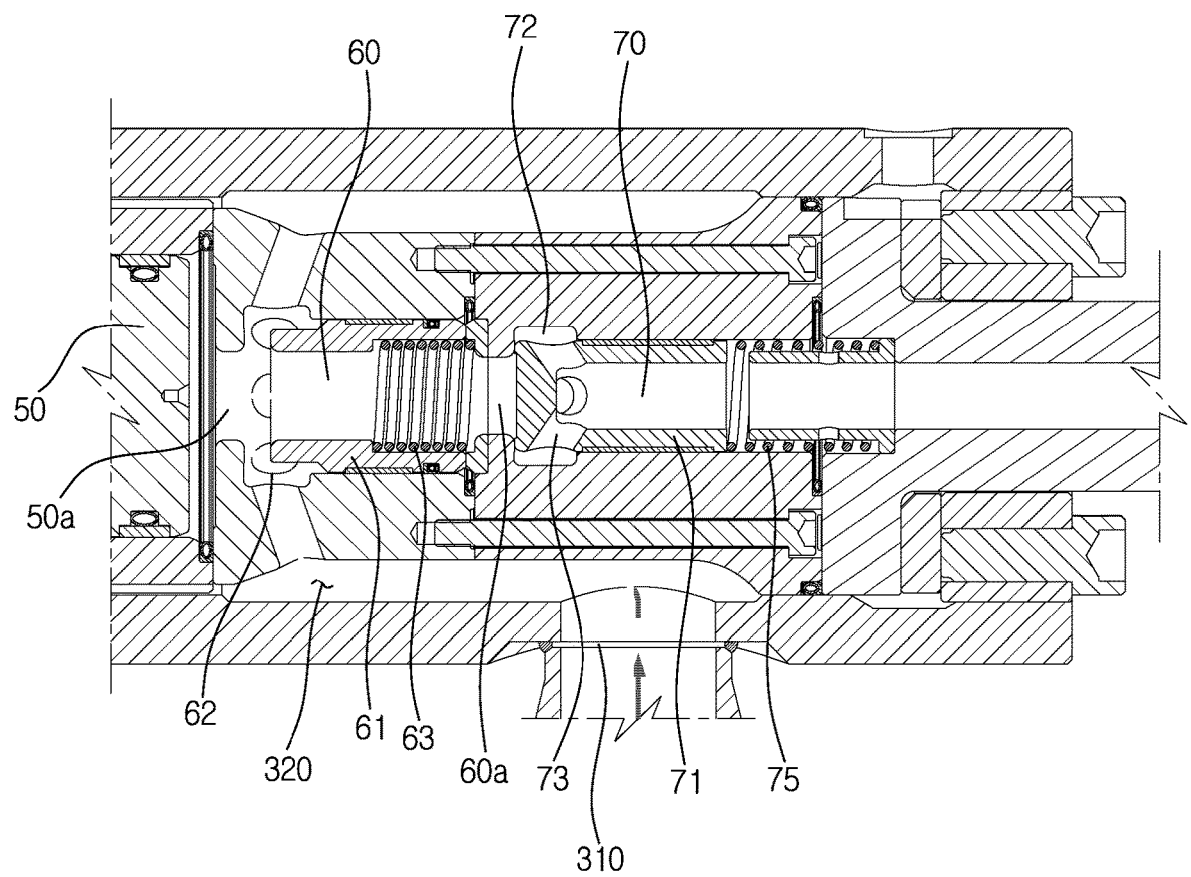
FIG. 8 is a reference diagram showing an opening/closing member of a suction valve in an open condition.

As shown in FIGS. 6 and 7, the liquefied gas compression device includes a liquefied gas supply passage 320, a suction valve 60 and a discharge valve 70.

The liquefied gas supply passage 320 is a passage or channel for the liquefied gas supply to the suction valve 60. One end of the liquefied gas supply passage 320 is connected to a liquefied gas supply port 310 on one side of the gas supply pump, and the other end is connected to a liquefied gas inlet port 62 on one side of the suction valve 60. The liquefied gas to be compressed is supplied to the internal space of the suction valve 60 through the liquefied gas inlet port 62 via the liquefied gas supply port 310 and the liquefied gas supply passage 320. The liquefied gas supply passage 320 connected to the suction valve 60 is formed in a housing of the suction valve 60 that covers the suction valve 60.

An opening/closing member 61 is provided around the suction valve 60 to selectively open/close the liquefied gas inlet port 62. The opening/closing member 61 is connected to a spring member 63 around the bottom circumference of the suction valve 60 and can make a linear reciprocating motion by the compression and restoration of the spring member 63. When the opening/closing member 61 moves in the compression direction by the compression of the spring member 63, the liquefied gas inlet port 62 is opened, and when the opening/closing member 61 moves in the restoration direction by the restoration of the spring member 63, the liquefied gas inlet port 62 is closed. The compression and restoration of the spring member 63 is carried out by the force acting on the opening/closing member 61.

When the liquefied gas is supplied through the liquefied gas supply passage 320 with the liquefied gas inlet port 62 closed by the opening/closing member 61, as the piston 50 is retracted, the pressure of the internal space of the suction valve 60 is lower than the liquefied gas supply pressure, and the opening/closing member 61 moves in the compression direction of the spring member 63, and accordingly, the liquefied gas inlet port 62 is opened, and the liquefied gas is supplied to the internal space of the suction valve 60. In this way, the liquefied gas is supplied from the liquefied gas supply passage 320 to the suction valve 60.

The liquefied gas in the suction valve 60 is discharged at high pressure through the discharge valve 70, and the liquefied gas in the suction valve 60 is supplied to the discharge valve 70 through a suction valve outlet pipe 60a.

The discharge valve 70 is disposed in a discharge chamber 71. The discharge valve 70 makes a linear reciprocating motion within a predetermined distance in the discharge chamber 71 by the applied pressure. Additionally, in the same way as the suction valve 60, a spring member 75 is provided at the lower end of the discharge valve 70 to allow the discharge valve 70 to make a linear reciprocating motion by the compression and restoration of the spring member 75. The compression and restoration of the spring member 75 is determined based on a force acting on the discharge valve 70, and the force acting on the discharge valve 70 is the pressure of the liquefied gas discharged from the suction valve 60 by the pressure of the piston 50.

The discharge valve 70 is configured to close the suction valve outlet pipe 60a when the spring member 75 is restored. When the discharge valve 70 moves in the compression direction of the spring member 75, a space is formed on top of the discharge chamber 71, and the suction valve outlet pipe 60a is opened. Additionally, an auxiliary chamber 72 of a predetermined space is provided around the top circumference of the discharge chamber 71, and the auxiliary chamber 72 is connected to the space on top of the discharge chamber 71 and is also connected to a discharge inlet pipe 73 on one side of the discharge valve 70.

That is, when the space is formed on top of the discharge chamber 71 by the movement of the discharge valve 70, the corresponding space is spatially connected to the suction valve outlet pipe 60a and is also connected to the auxiliary chamber 72. Additionally, due to the structure in which the auxiliary chamber 72 is connected to the discharge inlet pipe 73, the liquefied gas discharged through the suction valve outlet pipe 60a is supplied to the internal space of the discharge chamber 71 via the auxiliary chamber 72 through the space 74 on top of the discharge chamber.

Figure 9A:
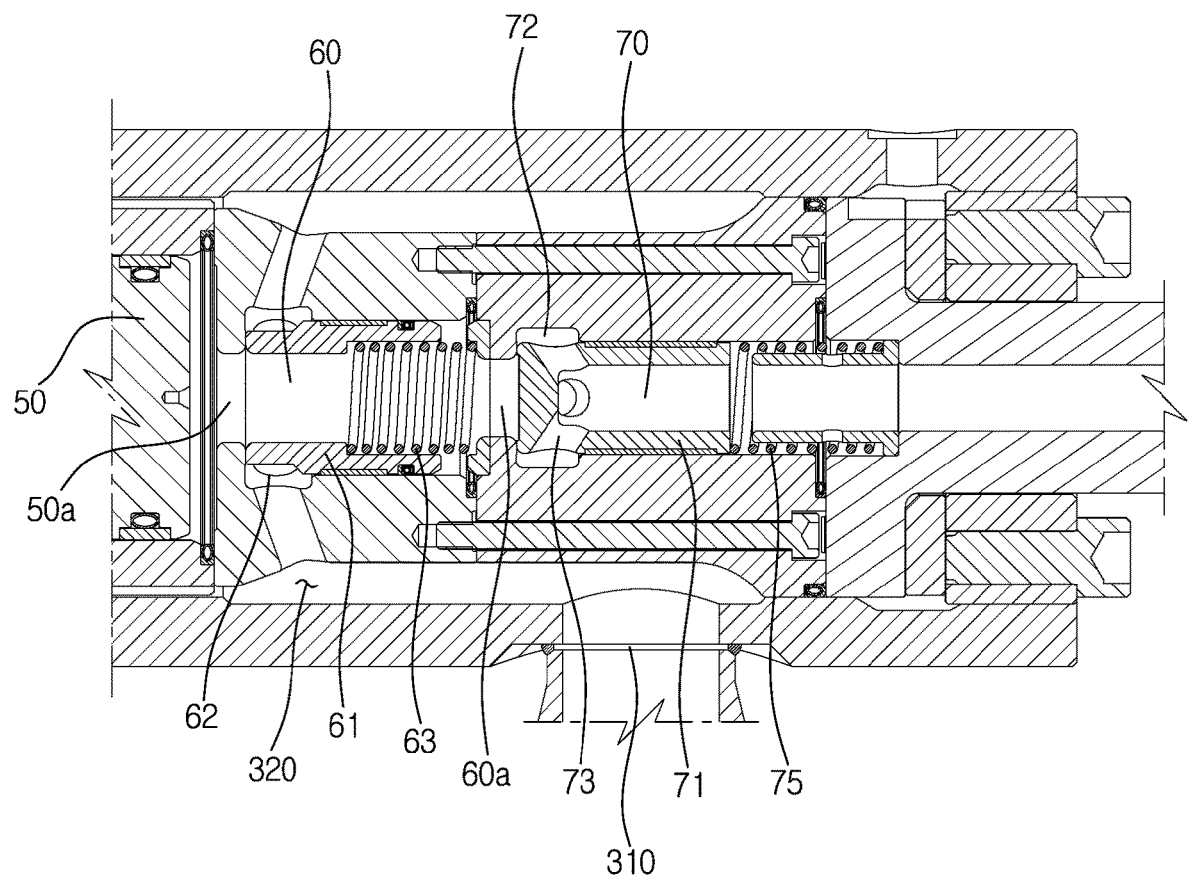
FIGS. 9A and 9B are reference diagrams illustrating the operation of a discharge valve.
Figure 9B:
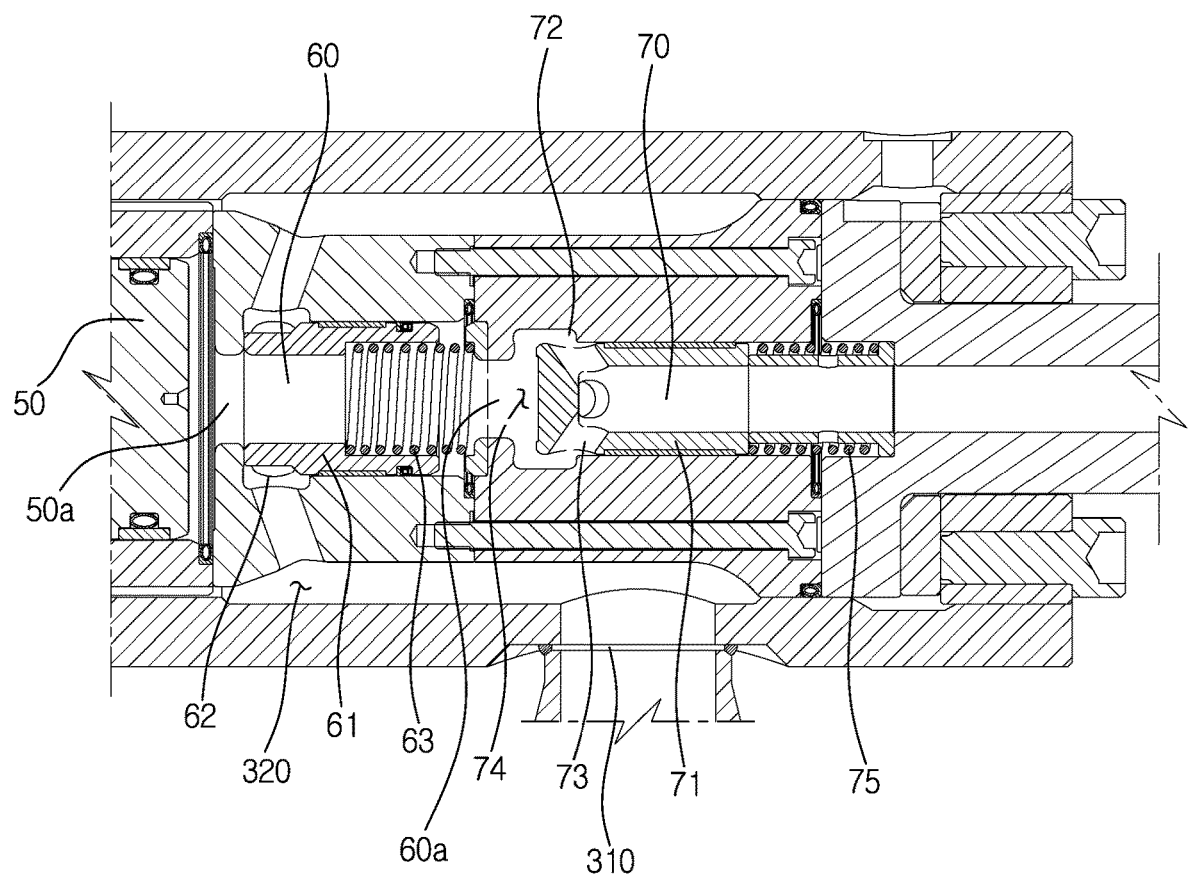

When the pressure of the piston 50 is applied to the suction valve 60 filled with the liquefied gas (see FIG. 9A), the liquefied gas in the suction valve 60 is discharged through the suction valve outlet pipe 60a, and in this instance, the pressure of the liquefied gas discharged through the suction valve outlet pipe 60a is applied to the discharge valve 70. When the pressure is applied to the discharge valve 70, the discharge valve 70 moves in the compression direction of the spring member 75, and accordingly, the space 74 is formed on top of the discharge chamber 71, and the liquefied gas discharged through the suction valve outlet pipe 60a moves to the auxiliary chamber 72 through the space 74 on top of the discharge chamber 71 (see FIG. 9B). Due to the structure in which the auxiliary chamber 72 is connected to the discharge inlet pipe, the liquefied gas in the auxiliary chamber 72 is supplied to the internal space of the discharge inlet pipe, and finally, the compressed liquefied gas is discharged through the discharge valve 70.

When the piston 50 moves in the decompression direction and the liquefied gas in the suction valve 60 is not discharged through the suction valve outlet pipe 60a, the discharge chamber 71 is restored to the original state by the restoration of the spring member 75, and the space 74 on top of the discharge chamber 71 disappears and the discharge chamber 71 closes the suction valve outlet pipe 60a.

Due to the structure in which the liquefied gas discharged from the suction valve outlet pipe 60a is supplied to the discharge valve 70 via the space 74 on top of the discharge chamber 71 and the auxiliary chamber 72, it is possible to prevent the backflow of the liquefied gas at the rear end of the discharge valve 70 toward the suction valve 60 by the auxiliary chamber 72 and the space 74 on top of the discharge chamber 71.

In the above description, when the liquefied gas is discharged through the suction valve outlet pipe 60a, since the operating pressure of the piston 50 is much higher than the supply pressure of the liquefied gas supplied to the liquefied gas supply passage 320, the liquefied gas inlet port 62 is closed by the opening/closing member 61.

As described above, as the pressure of the piston 50 making the linear reciprocating motion in the cylinder 80 is applied to the liquefied gas compression device, the liquefied gas is discharged at high pressure through the suction valve 60 and the discharge valve 70 of the liquefied gas compression device.

Meanwhile, in the process of liquefied gas compression and discharge by the liquefied gas compression device, the liquefied gas in the liquefied gas compression device may enter the internal space of the cylinder 80 through a micro-gap between the piston 50 and the cylinder 80. When sealing prevents the liquefied gas from entering, the liquefied gas is discharged without leaks, thereby increasing the pump efficiency. However, when there is no sealing for preventing the liquefied gas from entering, the liquefied gas entering the internal space of the cylinder 80 induces cavitation by the friction heat during the linear reciprocating motion of the piston 50, causing mechanical damage to the piston 50, the cylinder 80 and the drive shaft 40.

Accordingly, completely preventing or partially allowing the introduction of liquefied gas into the internal space of the cylinder 80 has advantages and disadvantages.

The present disclosure proposes an approach to increase the efficiency of the pump and prevent cavitation caused by the introduction of liquefied gas through the piston 50 sealing structure that blocks or allows the introduction of liquefied gas.

The piston 50 sealing structure is largely divided into a cylinder side sealing structure and a rod side sealing structure. The cylinder side sealing structure is a sealing structure for the piston 50 embedded in the cylinder, and the rod side sealing structure is a sealing structure for the piston portion which is not embedded in the cylinder 80, i.e., the rod.

The present disclosure designs the cylinder side sealing structure to allow the introduction of liquefied gas to some extent, and the rod side sealing structure to prevent the introduction of liquefied gas and other materials. Furthermore, the present disclosure proposes configurations for preventing the introduction of liquefied gas and other materials for both the cylinder side sealing structure and the rod side sealing structure.

Figure 10:
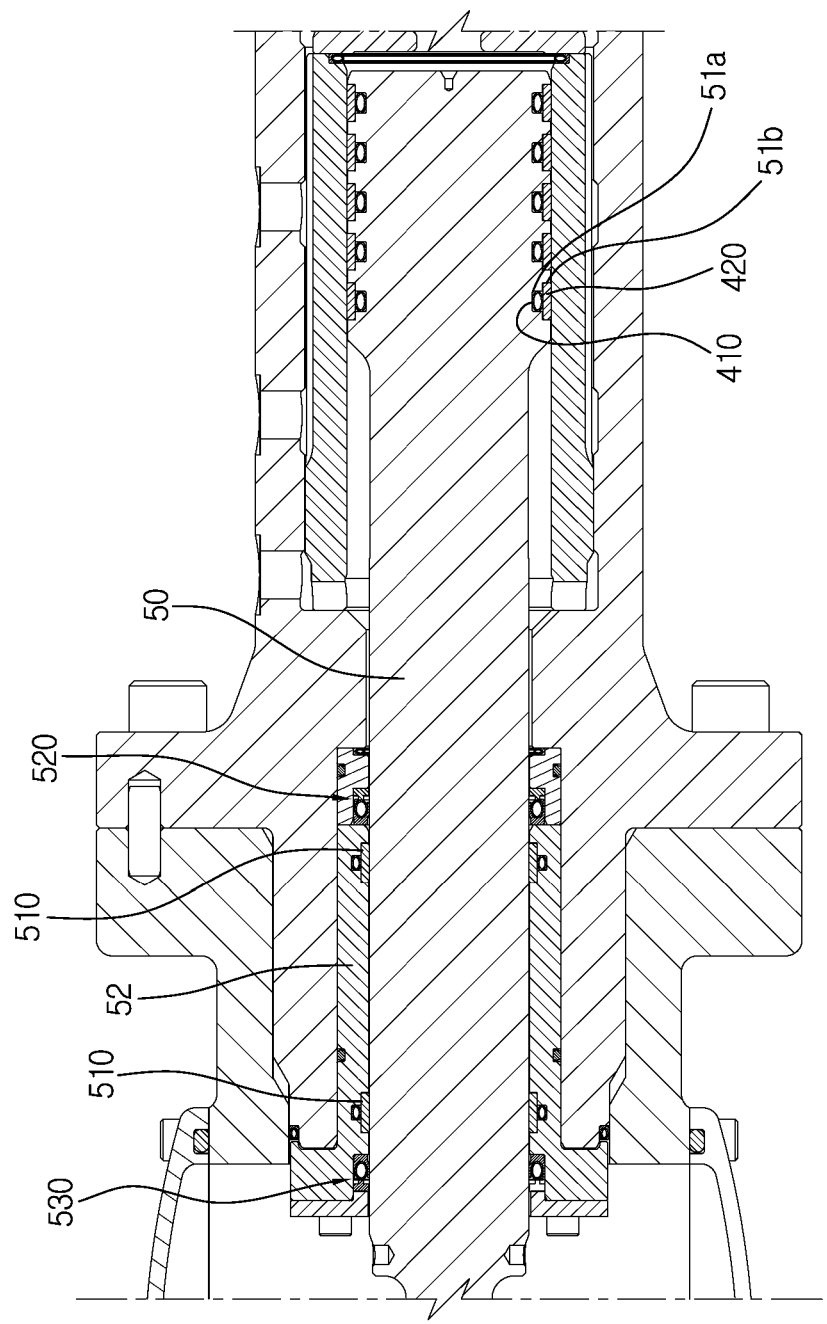
FIG. 10 is a reference diagram showing a cylinder side sealing structure and a rod side sealing structure.
Figure 11A:
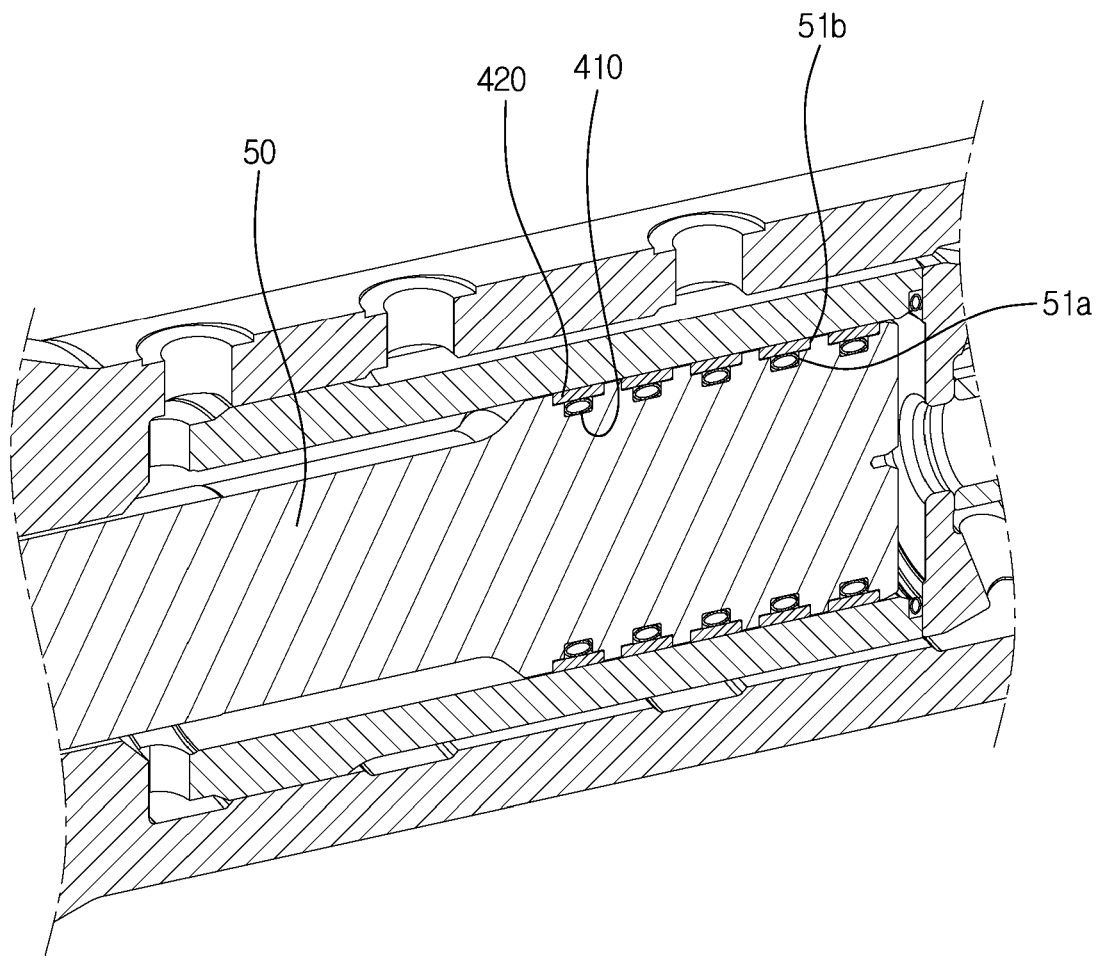
FIGS. 11A and 11B are perspective views of a cylinder side sealing structure.

As shown in FIGS. 10 and 11A, the cylinder side sealing structure includes a spring member seating groove 51a and a guide ring seating groove 51b spatially connected to the circumference of the piston portion embedded in the cylinder 80. The spring member seating groove 51a and the guide ring seating groove 51b are designed in a multi-step shape such that the width of the guide ring seating groove 51b is larger than the width of the spring member seating groove 51a. A spring member 410 having a hollow shape and thus an elastic property is mounted in the spring member seating groove 51a, and a band-shaped plate type guide ring 420 is mounted in the guide ring seating groove 51b adjacent to the spring member seating groove 51a. The width of the spring member 410 seated in the spring member seating groove 51a is smaller than the width of the guide ring 420 seated in the guide ring seating groove.

The guide ring 420 plays a role in guiding the movement of the piston 50 during the reciprocating motion of the piston in the cylinder, and the spring member 410 which is in contact with the guide ring 420 and seated in the spring member seating groove 51a plays a role in damping the force applied to the guide ring during the movement of the piston 50. With the spring member 410, it is possible to uniformly maintain the position of the guide ring 420, thereby stably guiding the movement of the piston 50.

A combination of the guide ring 420 and the spring member 410 is repeated at regular intervals along the lengthwise direction of the piston portion. In an embodiment, the combination of the guide ring 420 and the spring member 410 may be repeated five times.

The cylinder side sealing structure including the guide ring 420 and the spring member 410 as described above is designed to allow the introduction of liquefied gas to some extent, and this design is to effectively suppress overheat in the internal space of the cylinder 80.

The cylinder side sealing structure may be designed not only to allow the introduction of liquefied gas as described above but also to disallow the introduction of liquefied gas. The cylinder side sealing structure that disallows the introduction of liquefied gas may be a structure that is faithful to the intrinsic purpose of sealing.

Figure 11B:
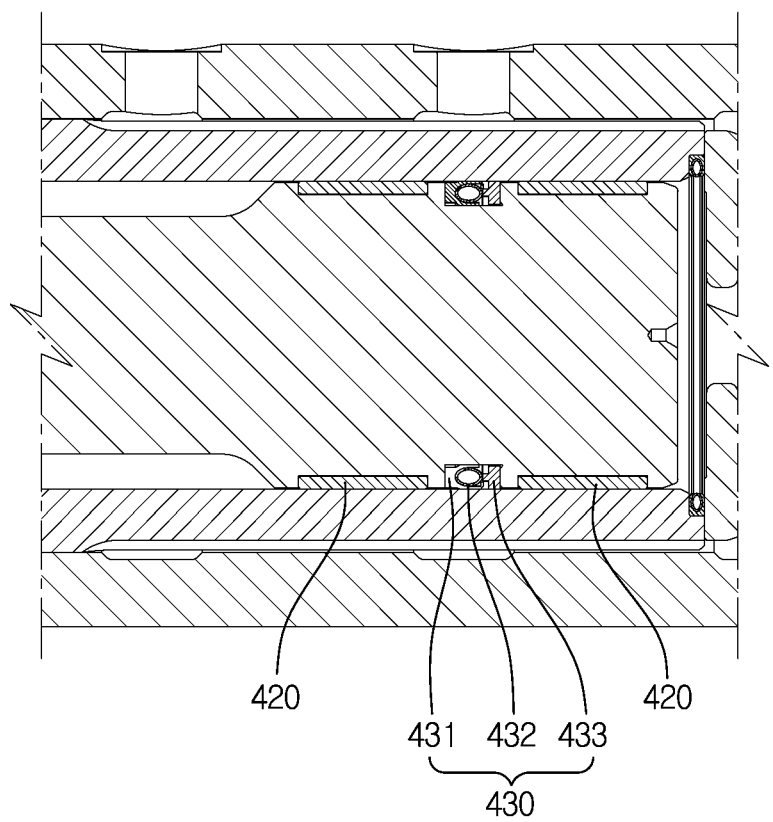

Specifically, the cylinder side sealing structure that disallows the introduction of liquefied gas includes a combination of the guide ring 420 and a piston seal 430 as shown in FIG. 11B. Specifically, the guide ring seating groove is disposed along the circumference of the piston portion, and the band-shaped plate type guide ring 420 is mounted in the corresponding guide ring seating groove. Additionally, a piston seal seating groove is disposed on the circumference of the piston portion located in the lengthwise direction of the piston portion apart from the guide ring seating groove, and the piston seal 430 is mounted in the corresponding piston seal seating groove.

The guide ring 420 is positioned on the left and right sides of the piston seal 430 and plays a role in guiding the movement of the piston 50, and the piston seal 430 plays a role in preventing the liquefied gas from entering.

The detailed structure of the piston seal 430 is as follows. The piston seal 430 includes a contact member 431, a spring member 432 and a stopper 433. The contact member 431, the spring member 432 and the stopper 433 are disposed around the piston 50.

The contact member 431 has one surface in close contact with the outer surface of the piston 50 and the other surface in close contact with the inner wall of the cylinder 80, and the contact member 431 has a seating groove in which the spring member 432 is seated. The spring member 432 is inserted into the seating groove of the contact member 431 and plays a role in applying a force to cause the contact member 431 to come into close contact with the outer surface of the piston 50 and the inner wall of the cylinder 80 through the restoring force of the spring member 432. It is possible to prevent the liquefied gas from moving from one side of the cylinder to the other side through a combination of the contact member 431 and the spring member 432. The stopper 433 plays a role in preventing the spring member 432 from moving out of the seating groove of the contact member 431.

Figure 12:
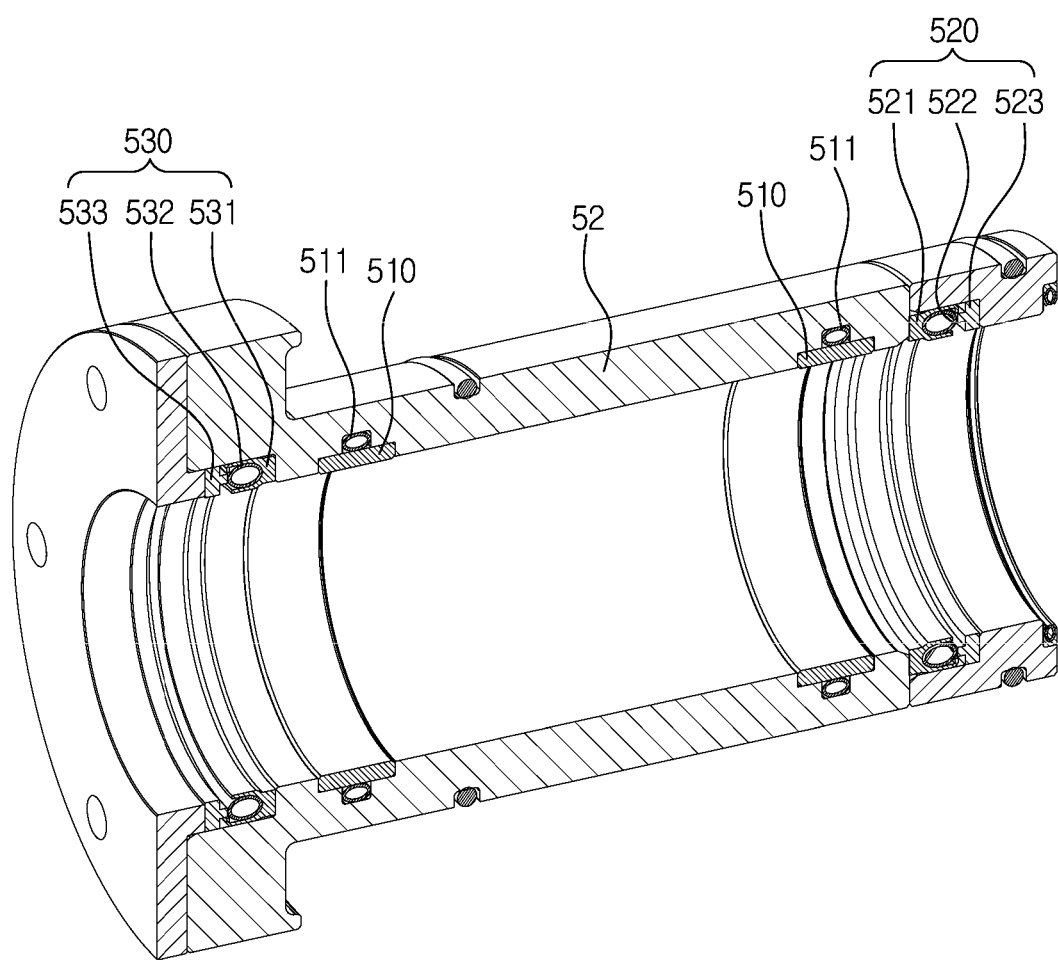
FIG. 12 is a perspective view of a rod side sealing structure.

Subsequently, describing the rod side sealing structure, as shown in FIGS. 10 and 12, the rod side sealing structure is designed to prevent the introduction of liquefied gas from the cylinder and prevent the introduction of air and impurities at the coupled part of the drive shaft 40 and the piston 50.

A piston cover 52 is disposed around the rod portion at which the rod portion of the piston 50 is located, and the piston cover 52 includes a rod seal 520, a guide ring 510 and a wiper seal 530. The rod seal 520 is disposed on the piston cover 52 on the side of the cylinder 80, and the wiper seal 530 is disposed on the piston cover 52 on the side of the drive shaft 40. Additionally, the guide ring is positioned on the piston cover 52 adjacent to each of the rod seal 520 and the wiper seal 530, and the guide ring is located in the inner direction of the rod portion. Accordingly, the wiper seal 530, the guide ring, the guide ring and the rod seal 520 are arranged on the piston cover 52 in that order from the drive shaft 40 to the cylinder 80.

The wiper seal 530 plays a role in preventing air and other materials such as impurities from entering from the drive shaft 40, and the rod seal 520 plays a role in preventing liquefied gas from entering from the cylinder 80. Additionally, the guide ring plays a role in guiding the movement of the rod portion on the piston cover 52.

The rod seal 520 and the wiper seal 530 have the same structure as the piston seal applied to the cylinder side sealing structure. That is, in the same way as the piston seal 430, each of the rod seal 520 and the wiper seal 530 includes a contact member 531, a spring member 532 and a stopper 533.

Additionally, in the same way as the guide ring 510 applied to the cylinder side sealing structure, the guide ring 510 applied to the rod side sealing structure further includes a spring member 511 therein. The guide ring 510 plays a role in guiding the movement of the rod portion during the reciprocating motion of the rod portion, and the spring member 511 is in contact with the guide ring 510 and plays a role in damping the force applied to the guide ring during the movement of the rod portion. With the spring member 511, it is possible to uniformly maintain the position of the guide ring 510, thereby stably guiding the movement of the rod portion.

Meanwhile, one of the most important features of the present disclosure is that each of the plurality of cylinders 80 provided in the camshaft 10 can independently operate.

As described above, the plurality of cam noses 20 are provided in the camshaft 10, spaced apart from each other, the cam roller 30 is provided in close contact with each cam nose 20, and each cam roller 30 is connected to the drive shaft 40, the piston 50, the cylinder 80 and the liquefied gas compression device. Accordingly, this structure enables the operation of the plurality of liquefied gas compression devices through the operation of one camshaft 10.

Under this structure, it is possible to independently control the operation of each of the plurality of cylinders 80, i.e., the operation of each of the plurality of liquefied gas compression devices. To this end, the present disclosure proposes technology to force the cam roller 30 to be spaced apart from the cam nose 20 to stop the operation of the drive shaft 40, the piston 50, the cylinder 80 and the liquefied gas compression device connected to the cam roller 30 forced to be spaced apart. Specifically, it can be realized through three embodiments. The first embodiment is designed to cause the cam roller 30 to be spaced apart from the cam nose 20 using a cutoff bolt 140, the second embodiment is designed to cause the cam roller 30 to be spaced apart from the cam nose 20 using a cutoff pin 620, and the third embodiment is designed to cause the cam roller 30 to be spaced apart from the cam nose 20 using a rack-pinion 730.

To begin with, the first embodiment is as follows.

Figure 13:
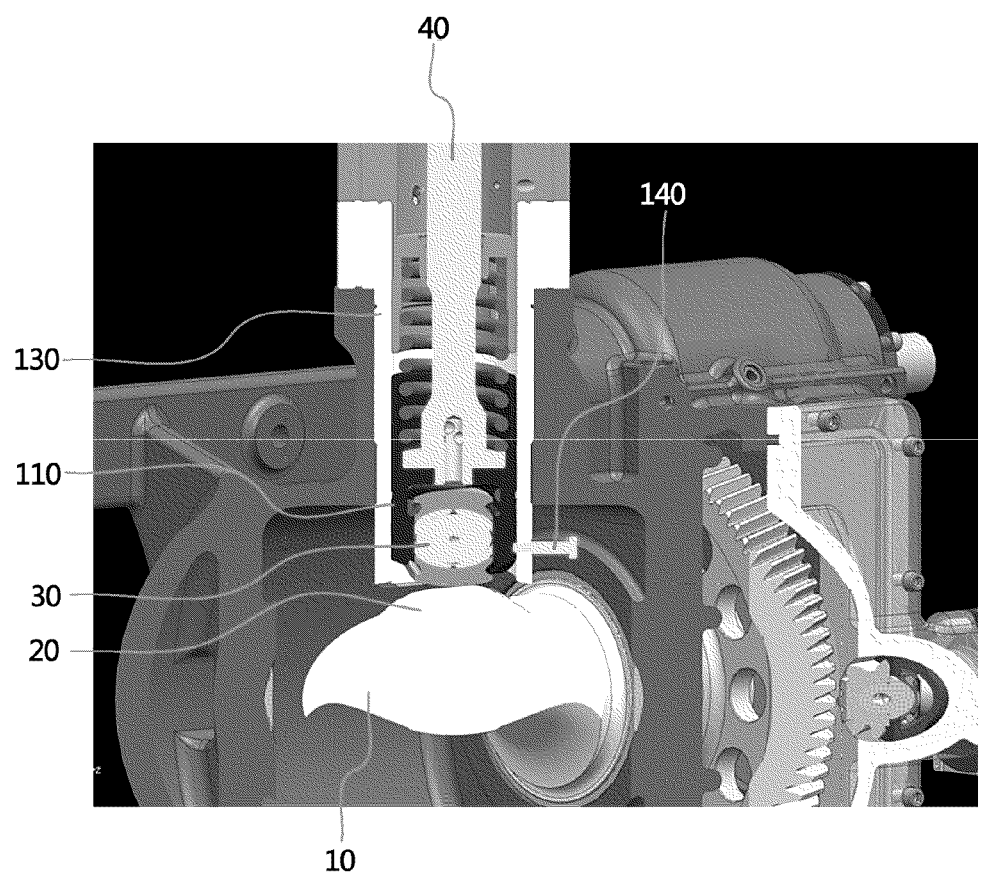
FIGS. 13 and 14 are reference diagrams illustrating a cam roller and a cam nose spaced apart from each other using a cutoff bolt of a first embodiment.
Figure 14:
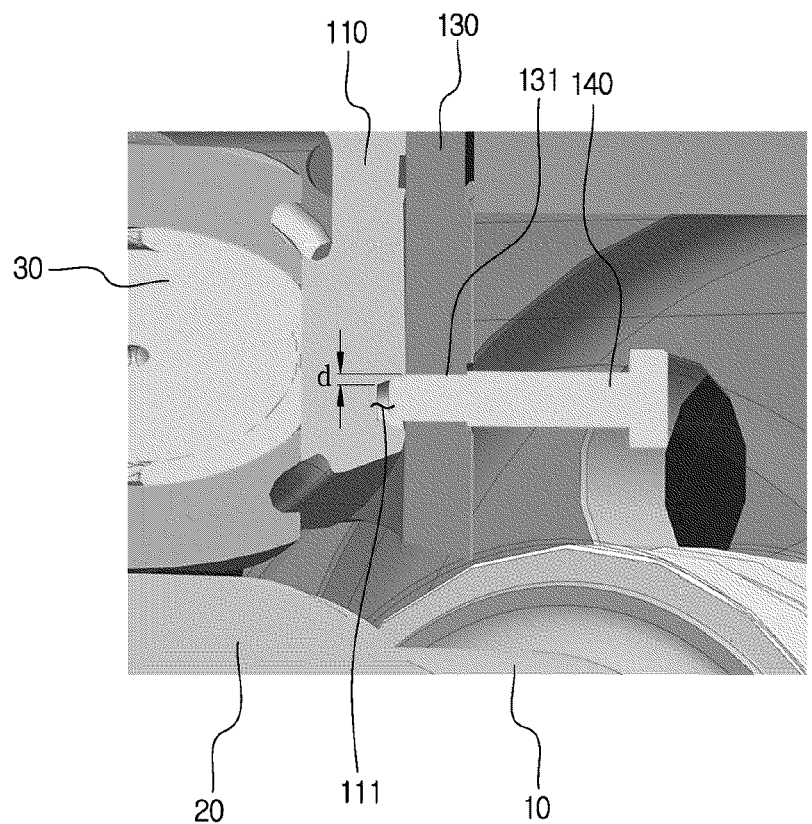

Referring to FIGS. 13 and 14, the cam roller-drive shaft case 130 has, on one side, a cutoff bolt through-hole 131 through which the cutoff bolt 140 is inserted and passed, and the integral connection member 110 has, on one side, a cutoff bolt insertion groove 111 into which the cutoff bolt 140 is inserted to a predetermined depth.

The cam nose 20 and the cam roller 30 may be induced to be spaced apart from each other through the process of inserting the cutoff bolt 140 into the cutoff bolt insertion groove 111 through the cutoff bolt through-hole 131.

As the cam nose 20 and the cam roller 30 are spaced apart from each other, even though the camshaft 10 rotates, the cam nose 20 and the cam roller 30 do not come to contact with each other, and the operation of the drive shaft 40 and the piston 50 connected to the corresponding cam roller 30 is stopped. Through this process, it is possible to selectively control the operation of each piston 50 provided in the camshaft 10.

Below is the principle in which the cam nose 20 and the cam roller 30 are spaced apart from each other by the insertion of the cutoff bolt 140 into the cutoff bolt insertion groove 111 (see FIGS. 4A and 4B).

The center of the cutoff bolt through-hole 131 and the center of the cutoff bolt insertion groove 111 adjacent to each other do not match and are offset each other.

The cam roller-drive shaft case 130 has the cutoff bolt through-hole 131 and the integral connection member 110 has the cutoff bolt insertion groove 111, and the cutoff bolt 140 is inserted into the cutoff bolt insertion groove 111 through the cutoff bolt through-hole 131. The cutoff bolt through-hole 131 and the cutoff bolt insertion groove 111 may be designed with the same diameter.

In this instance, the center of the cutoff bolt through-hole 131 and the center of the cutoff bolt insertion groove 111 are offset each other. On the basis of the piston 50 being perpendicular to the camshaft 10, the center of the cutoff bolt insertion groove 111 is located at a slightly lower position than the center of the cutoff bolt through-hole 131. Additionally, the cutoff bolt insertion groove 111 has a tapered shape having the decreasing radius with the increasing depth. The cutoff bolt insertion groove 111 have a difference 'd' between the radius at the entrance and the radius at the lower surface by the tapered shape (see FIG. 14).

Under this condition, the cutoff bolt 140 passing through the cutoff bolt through-hole 131 is inserted into the cutoff bolt insertion groove 111, and since the center of the cutoff bolt insertion groove 111 is located at a slightly lower position than the center of the cutoff bolt through-hole 131, the cutoff bolt 140 contacts the side of the cutoff bolt insertion groove 111 having the tapered shape.

When the cutoff bolt 140 is continuously tightened in the insertion direction, the cutoff bolt 140 moves more inward of the cutoff bolt insertion groove 111 along the side of the cutoff bolt insertion groove 111. The movement of the cutoff bolt 140 inward of the cutoff bolt insertion groove 111 represents the upward movement of the integral connection member 110 having the cutoff bolt insertion groove 111.

When one end of the cutoff bolt 140 contacts the lower surface of the cutoff bolt insertion groove 111 in this way, the integral connection member 110 moves up by the difference 'd' between the radii at the entrance and the lower surface of the cutoff bolt insertion groove 111. Here, a predetermined part of the cutoff bolt 140 also may have a tapered shape to make it easy to insert, and in this case, the movement distance of the integral connection member 110 corresponds to a value obtained by subtracting the taper thickness of the cutoff bolt 140 from 'd'.

Through the above-described process, the integral connection member 110 may move up by the length 'd', and this represents that the cam nose 20 and the cam roller 30 are spaced apart from each other by the length 'd'. By this principle, the cam nose 20 and the cam roller 30 may be kept apart from each other, and as the cam nose 20 and the cam roller 30 are spaced apart from each other, even though the camshaft 10 rotates, the drive shaft 40 and the piston 50 connected to the corresponding cam roller 30 do not operate.

Although the foregoing describes that the cam roller-drive shaft case 130 has, on one side, the cutoff bolt through-hole 131 into which the cutoff bolt 140 is inserted and passed through and the integral connection member 110 has, on one side, the cutoff bolt insertion groove 111 into which the cutoff bolt 140 is inserted to the predetermined depth, the position of the cutoff bolt through-hole 131 and the cutoff bolt insertion groove 111 is not limited to a particular position. In an embodiment, the cutoff bolt through-hole 131 and the cutoff bolt insertion groove 111 may be disposed at a position corresponding to the internal space of the camshaft 10 case (see FIGS. 4A and 4B), or the cutoff bolt through-hole 131 and the cutoff bolt insertion groove 111 may be disposed at a position corresponding to the outside of the camshaft 10 case.

Below is the configuration of the second embodiment using the cutoff pin 620.

Figure 15:
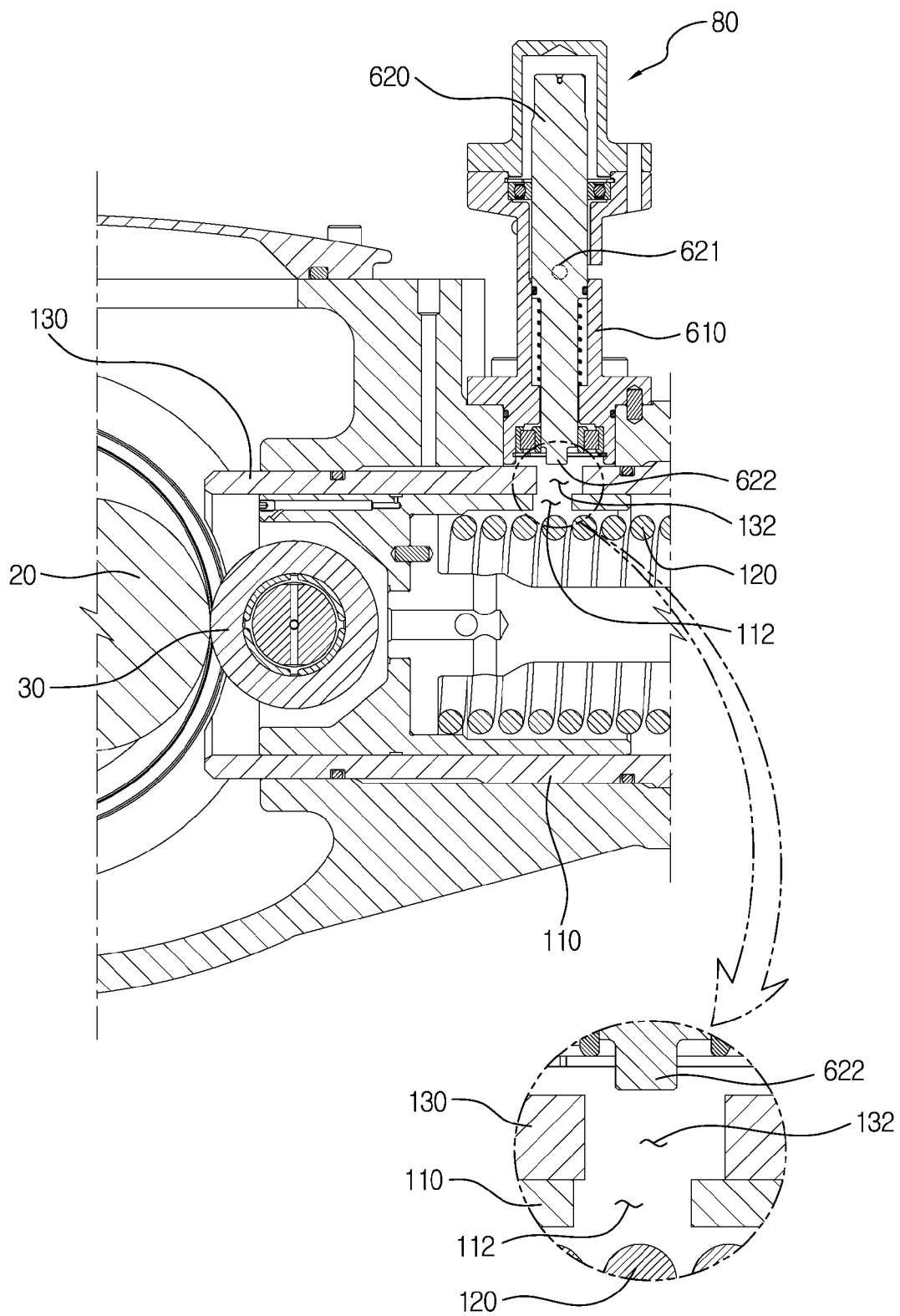
FIGS. 15 and 16 are reference diagrams illustrating a cam roller and a cam nose spaced apart from each other using a cutoff pin of a second embodiment.
Figure 16:
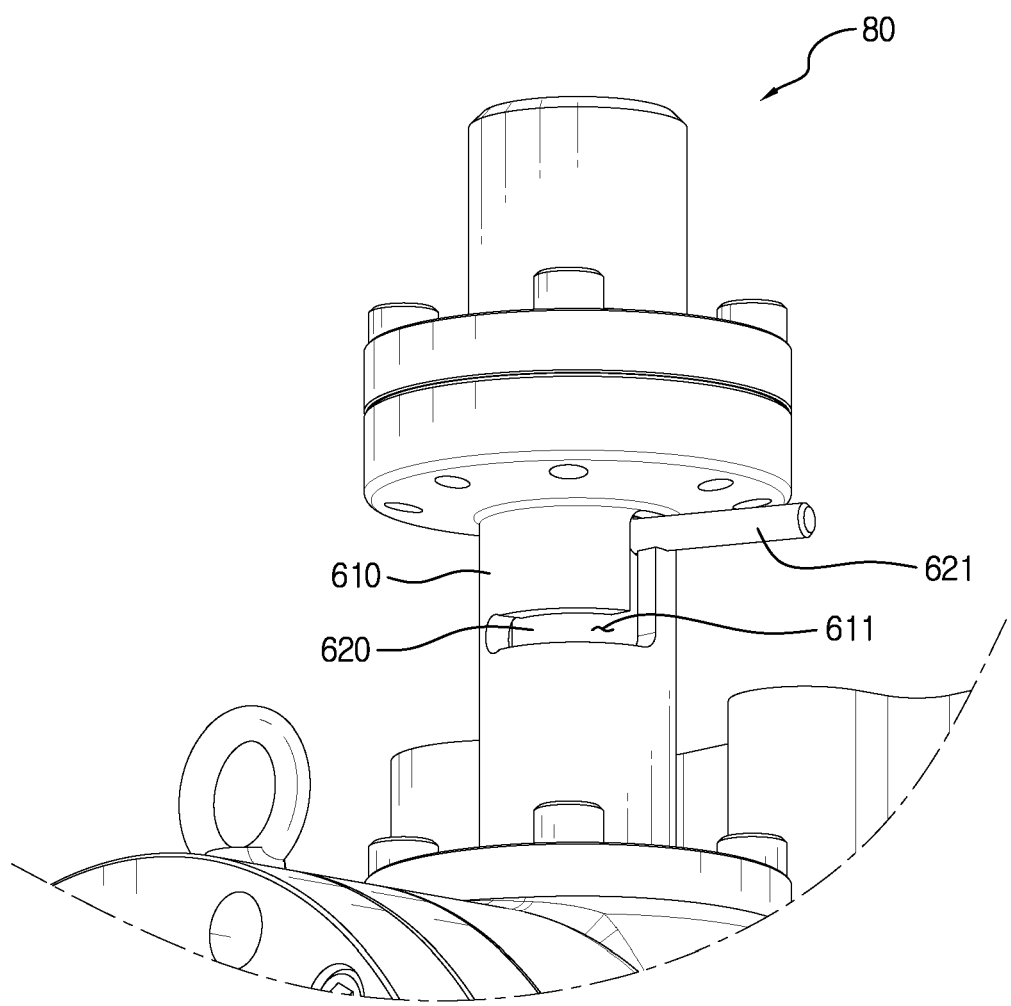

Referring to FIGS. 15 and 16, a hollow cylindrical cutoff pin guide member 610 is provided on one side of the cam roller-drive shaft case 130, and the cutoff pin 620 is inserted into the cutoff pin guide member 610. The cutoff pin 620 can move up or down in the cutoff pin guide member 610.

The cutoff pin guide member 610 has a cutoff pin guide groove 611 on one side. The cutoff pin guide groove 611 includes a vertical guide groove and a horizontal guide groove, and the vertical guide groove and the horizontal guide groove are spatially connected to each other. The vertical guide groove is extended from a first point to a second point on a vertical line, and the horizontal guide groove is extended from the second point of the vertical guide groove to a third point in the horizontal direction. The second point and the third point of the horizontal guide groove may be disposed at 0° point and 180° point.

A cutoff pin guide pin 621 is provided on one side of the cutoff pin 620, and is disposed in the cutoff pin guide groove 611. Accordingly, the cutoff pin guide pin 621 can move along the cutoff pin guide groove 611. When the cutoff pin guide pin 621 vertically moves from the first point of the cutoff pin guide groove 611 to the second point, the cutoff pin 620 moves down by the corresponding distance, and when the cutoff pin guide pin 621 horizontally moves from the second point of the cutoff pin guide groove 611 to the third point, the cutoff pin 620 rotates by an angle between the second point and the third point, for example, 180°.

The cutoff pin 620 has, on the lower surface, a cam roller spacing protrusion 622 of a cylindrical shape having a smaller radius than the cutoff pin 620. The center of the cam roller spacing protrusion 622 is eccentric from the center of a circle of the cutoff pin 620. When the cutoff pin guide pin 621 horizontally moves from the second point of the cutoff pin guide groove 611 to the third point, the cam roller spacing protrusion 622 on the lower surface of the cutoff pin 620 rotates by the predetermined angle, for example, 180°.

Meanwhile, the cam roller-drive shaft case 130 has, on one side, a cutoff pin through-hole 132 into which the cutoff pin 620 is inserted and passed through, and the integral connection member 110 has a cam roller spacing guide groove 112 corresponding to the cutoff pin through-hole 132.

Figure 17A:
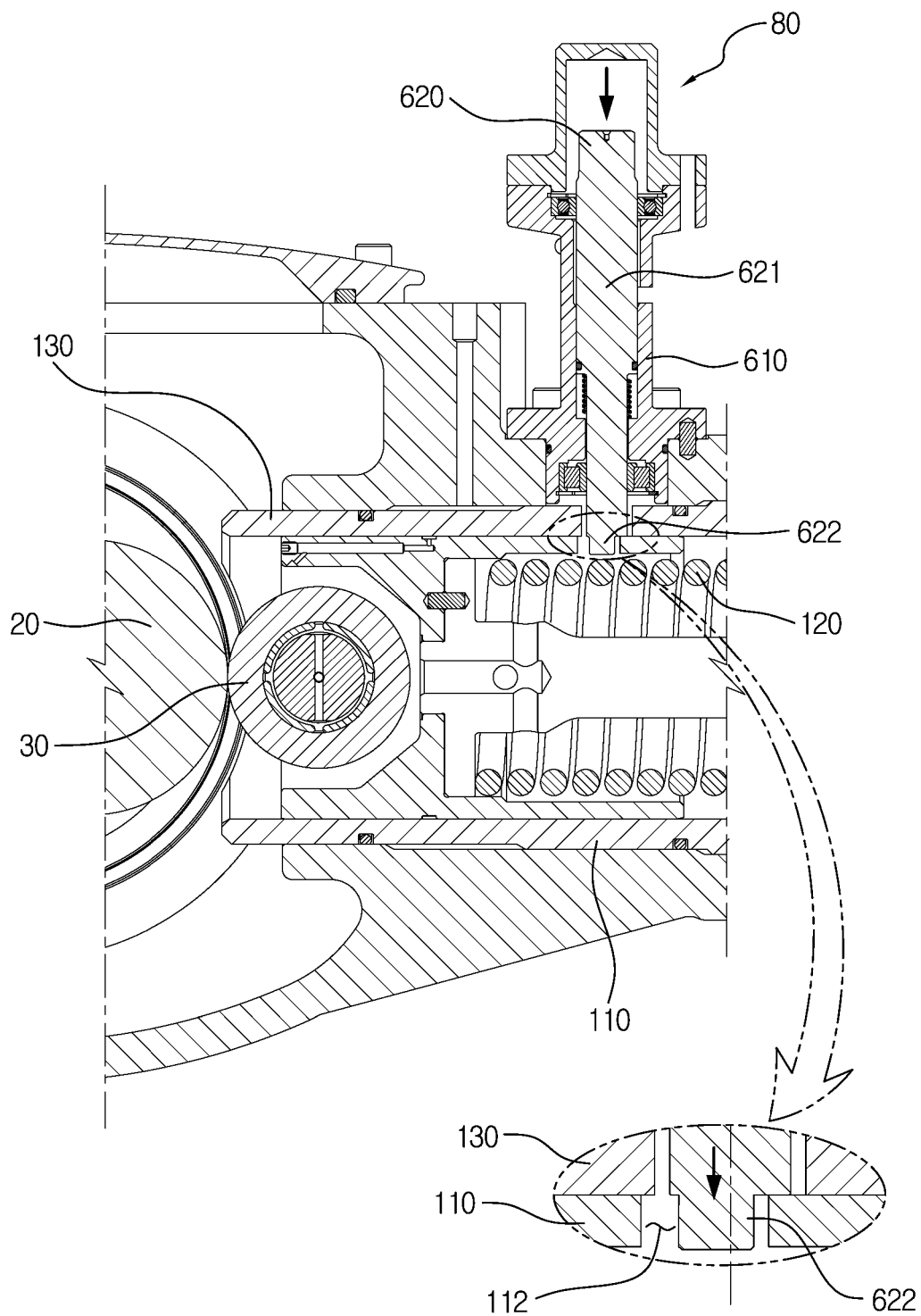
FIGS. 17A to 17C are reference diagrams showing an operation of causing a cam roller and a cam nose to be spaced apart from each other according to the second embodiment.

When the cutoff pin guide pin 621 is located at the second point, the cam roller spacing protrusion 622 at the lower end of the cutoff pin 620 is disposed in the cam roller spacing guide groove 112 of the integral connection member 110, and is in non-contact with the integral connection member 110 in the cam roller spacing guide groove 112 (see FIG. 17A).

Figure 17B:
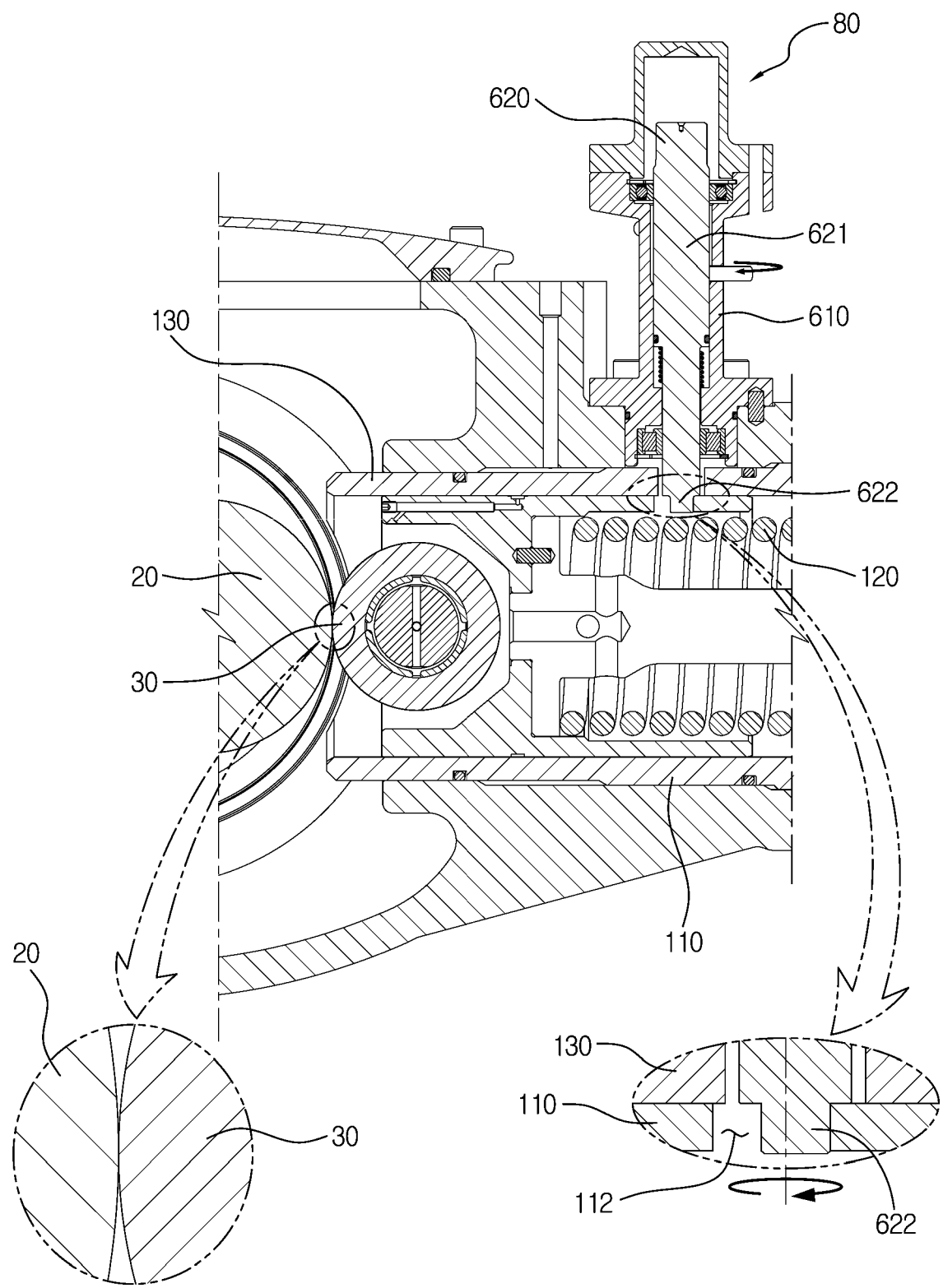
Figure 17C:
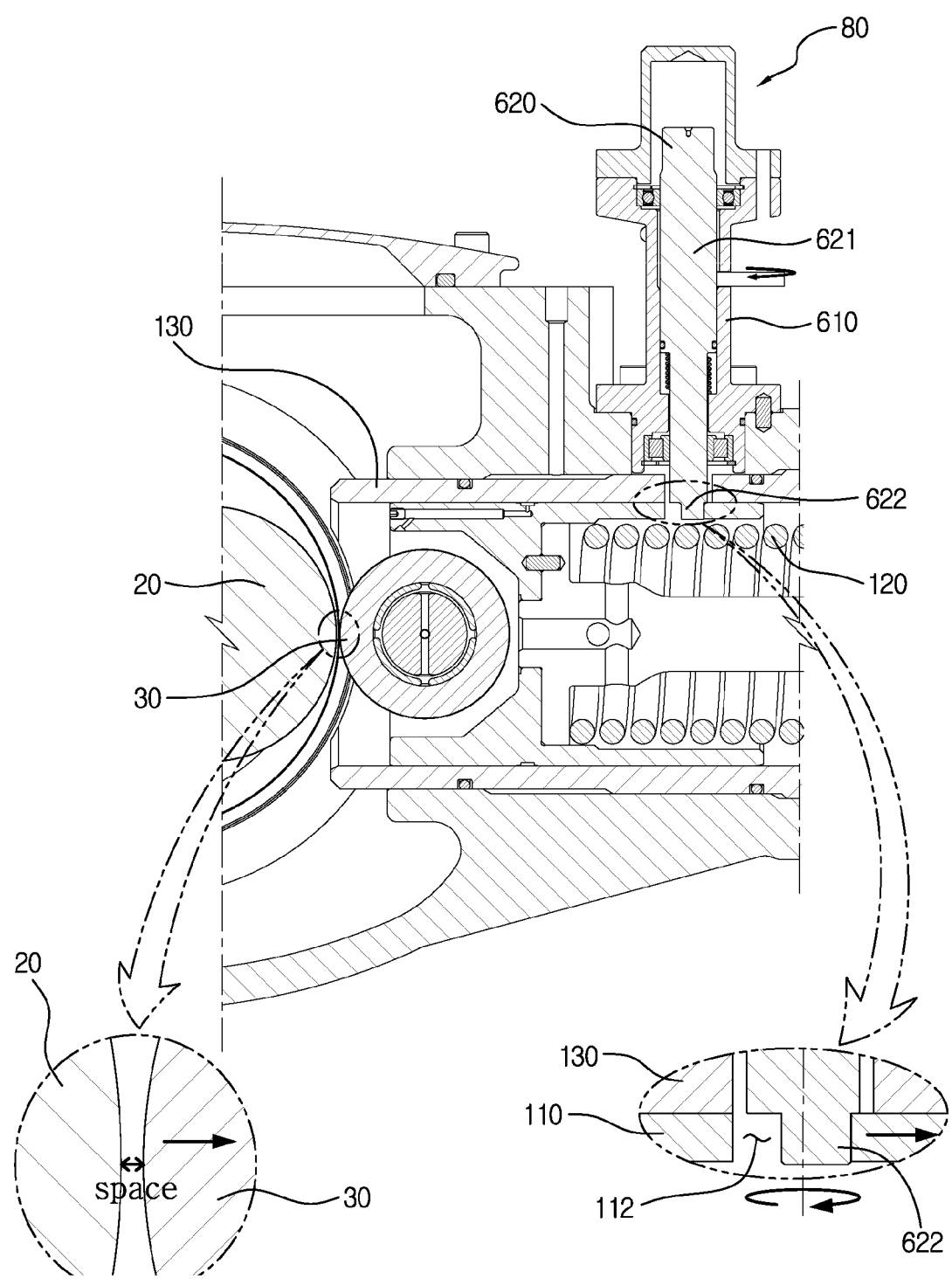

In this state, when the cutoff pin 620 protrusion moves from the second point of the cutoff pin guide groove 611 to the third point, the cutoff pin 620 makes a horizontal rotation and the cam roller spacing protrusion 622 also makes a horizontal rotation, and accordingly, the cam roller spacing protrusion 622 makes a horizontal rotation at a predetermined angle in the cam roller spacing guide groove 112 and comes into contact with the integral connection member 110 (see FIG. 17B). Subsequently, the cam roller spacing protrusion 622 physically pushes the integral connection member 110 in contact with the cam roller spacing protrusion 622, then the integral connection member 110 moves and the cam roller 30 also moves with the integral connection member 110, and finally, the cam roller 30 and the cam nose 20 are spaced apart from each other (see FIG. 17C).

On the contrary, when the cutoff pin guide pin 621 moves from the third point of the cutoff pin guide groove 611 to the second point, the moved integral connection member 110 is restored to the original state and the cam roller 30 and the cam nose 20 come into contact with each other again.

As described above, the cam nose 20 and the cam roller 30 may be induced to be spaced apart from each other through the configuration using the cutoff pin 620, and as the cam nose 20 and the cam roller 30 are spaced apart from each other, it is possible to selectively control the operation of the specific piston 50, i.e., the specific cylinder 80.

Below is the configuration of the third embodiment using the rack-pinion 730.

While the first and second embodiments are designed to cause the cam roller 30 and the cam nose 20 to be spaced apart from each other by inserting the cutoff bolt 140 or the cutoff pin 620 into the integral connection member 110, the third embodiment is designed to induce the cam roller 30 and the cam nose 20 to be spaced apart from each other through the movement of the drive shaft 40.

Figure 18:
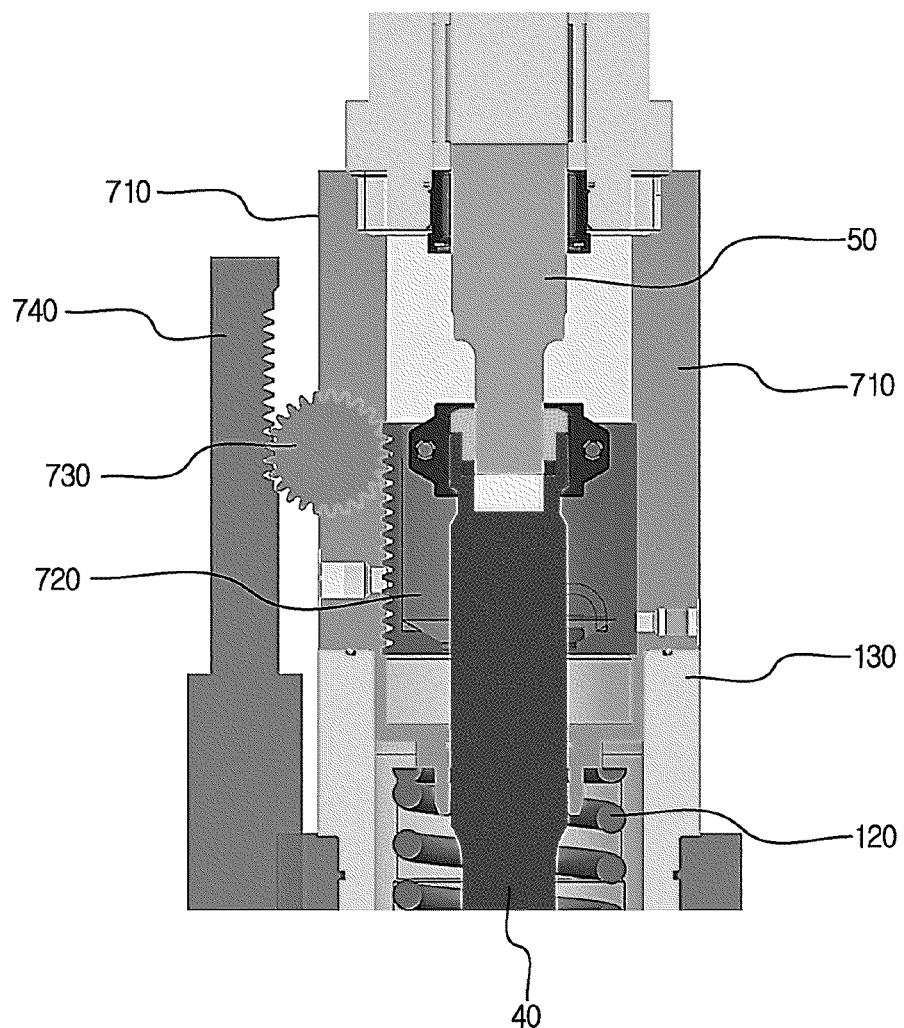
FIG. 18 are reference diagrams illustrating a cam roller and a cam nose spaced apart from each other using a rack-pinion of a third embodiment.

According to the third embodiment, as shown in FIG. 18, a coupling case 710 is further provided at the coupled part of the drive shaft 40 and the piston 50 to protect it from the outdoor environment. Additionally, the rack-pinion 730 device operated by a hydraulic cylinder 80 is further provided.

Specifically, a rack member 720 is provided in the internal space of the coupling case 710. The rack member 720 is connected and fixed to one side of the drive shaft 40 or both the drive shaft 40 and the piston 50. Accordingly, when the drive shaft 40 moves, the rack member 720 also moves together. In other words, when the rack member 720 moves, the drive shaft 40 and the piston 50 also move together.

A teeth-shaped rack is provided on the outer surface of the rack member 720. Additionally, the rack of the rack member 720 is engaged with the pinion 730. Accordingly, the rack member 720 can move up and down by the rotational motion of the pinion 730. A pinion guide member 740 is provided on the other side of the pinion 730 to transmit the driving force to the pinion 730, and the pinion guide member 740 selectively moves up and down by the hydraulic cylinder 80. A rack is also provided on the surface of the pinion guide member 740, and the pinion 730 is engaged with the rack of the pinion guide member 740.

Under this structure, when the pinion guide member 740 moves down through the hydraulic cylinder 80, the pinion 730 rotates in the counterclockwise direction, and the rack member 720 connected to the drive shaft 40 moves up by the counterclockwise rotation of the pinion 730. The upward movement of the rack member 720 represents the upward movement of the drive shaft 40, and the upward movement of the drive shaft 40 may induce the cam nose 20 and the cam roller 30 to be spaced apart from each other.

The method for causing the cam roller 30 and the cam nose 20 to be spaced apart from each other according to the first to third embodiments has been hereinabove described. Meanwhile, in inducing the cam roller 30 and the cam nose 20 to be spaced apart from each other using the first to third embodiments as described above, it is necessary to cause the cam roller 30 and the cam nose 20 to be spaced apart from each other with the cam nose 20 accurately facing the cam roller 30, and to this end, a predetermined turning gear may be provided. The turning gear may precisely adjust the rotation of the camshaft 10 so that the cam nose 20 accurately faces the cam roller 30.

The foregoing describes that the cam roller and the cam nose are induced to be spaced apart from each other through the above-described first to third embodiments, thereby independently controlling the operation of each cylinder, but according to the first to third embodiments, since the cam roller and the cam nose are spaced apart from each other, the piston is stopped and the liquefied gas is not discharged.

The present disclosure proposes technology to adjust the amount of discharge of liquefied gas. According to an embodiment of the present disclosure, the amount of discharge of liquefied gas may be controlled by adjusting the stroke length of the piston 50.

Figure 19:
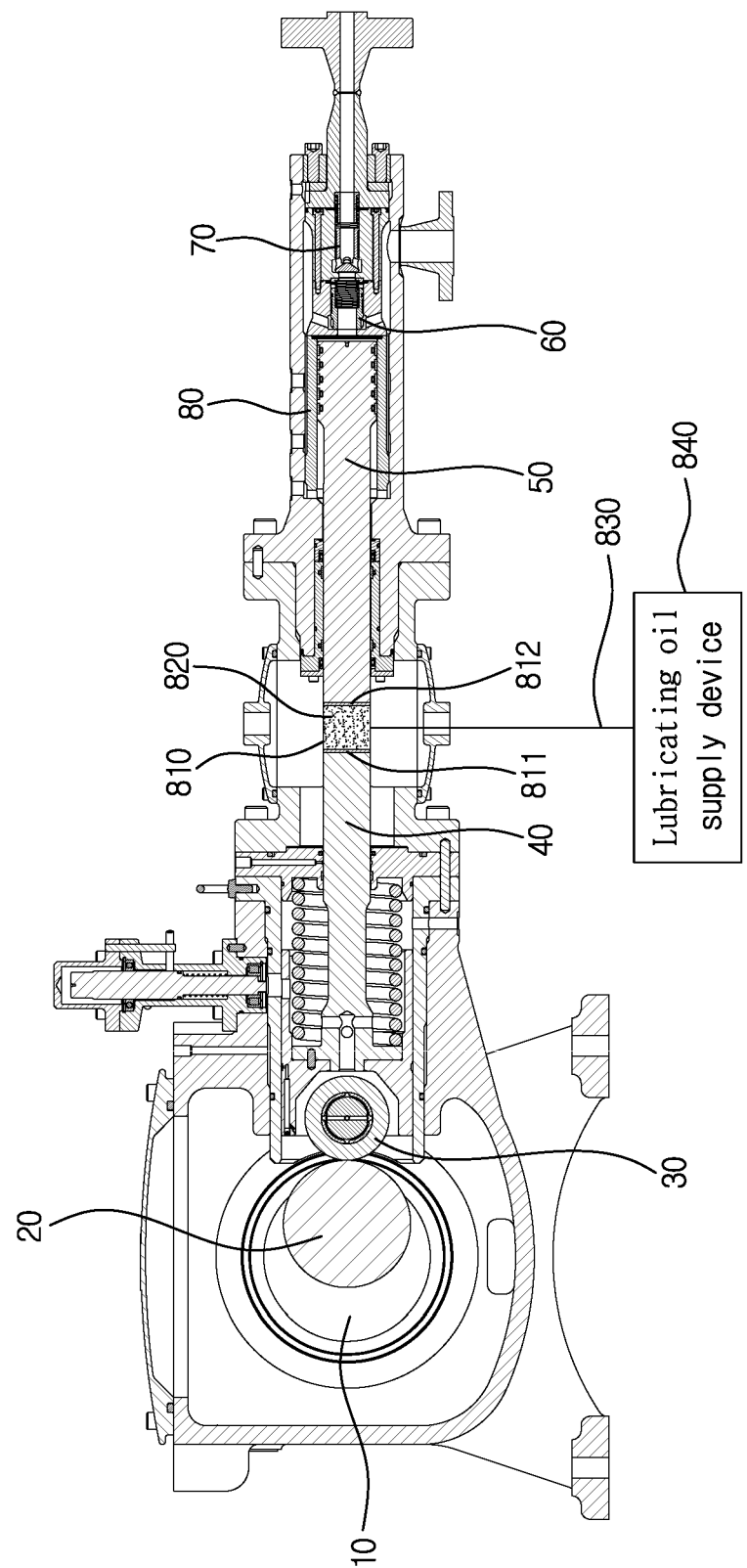
FIG. 19 is a configuration diagram of a gas supply pump with a pressure chamber.

Specifically, as shown in FIG. 19, a pressure chamber 810 is provided between the drive shaft 40 and the piston 50. A first surface 811 of the pressure chamber 810 contacts the drive shaft 40, and a second surface 812 of the pressure chamber 810 opposite the first surface 811 is fixed in contact with the piston 50. Accordingly, when the drive shaft 40 moves towards the piston 50, the driving force of the drive shaft 40 is applied to the first surface 811 of the pressure chamber 810 and is transmitted to the pressure chamber 810. In this instance, in case that the pressure chamber 810 is fully filled with lubricating oil, the driving force of the drive shaft 40 will be transmitted to the piston 50 via the pressure chamber 810 (first case), in case that the pressure chamber 810 is an empty space, the driving force of the drive shaft 40 disappears in the pressure chamber 810 and is not transmitted to the piston 50 (second case), and in case that the pressure chamber 810 is fully filled with lubricating oil, when some of the lubricating oil in the pressure chamber 810 are discharged by the applied driving force of the drive shaft 40, only some of the driving force of the drive shaft 40 will be transmitted to the piston 50 (third case).

An embodiment of the present disclosure may stop discharging the liquefied gas or control the amount of discharge of liquefied gas using the above-described principle.

Here, a lubricating oil supply passage 830 is provided on one side of the pressure chamber 810, and the lubricating oil 820 may be supplied to the pressure chamber 810 or discharged from the pressure chamber 810 through the lubricating oil supply passage 830. Additionally, the lubricating oil supply passage 830 is connected to a lubricating oil supply device 840. The amount of the lubricating oil 820 supplied to the pressure chamber 810 and the amount of the lubricating oil 820 discharged from the pressure chamber 810 may be set using the lubricating oil supply device 840.

The above-described three cases will be described in detail.

Figure 20A:
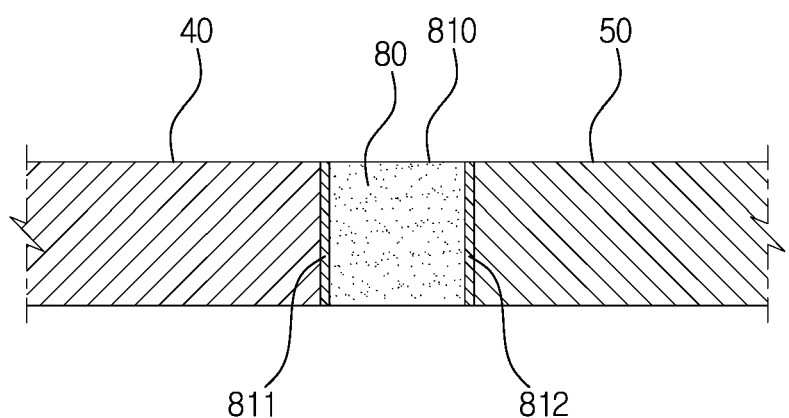
FIGS. 20A to 20C are reference diagrams illustrating a method of causing a drive shaft and a piston to be spaced apart from each other using a pressure chamber.

As shown in FIG. 20A, in case that the pressure chamber 810 is fully filled with the lubricating oil 820, when the driving force of the drive shaft 40 is applied to the first surface 811 of the pressure chamber 810, the driving force of the drive shaft 40 is applied to the piston 50 via the lubricating oil 820 filled in the pressure chamber 810, and finally, the pressure of the piston 50 is transmitted to the liquefied gas compression device and the liquefied gas is normally discharged. In this instance, the lubricating oil supply passage 830 is closed and the lubricating oil in the pressure chamber 810 is not discharged.

Figure 20B:
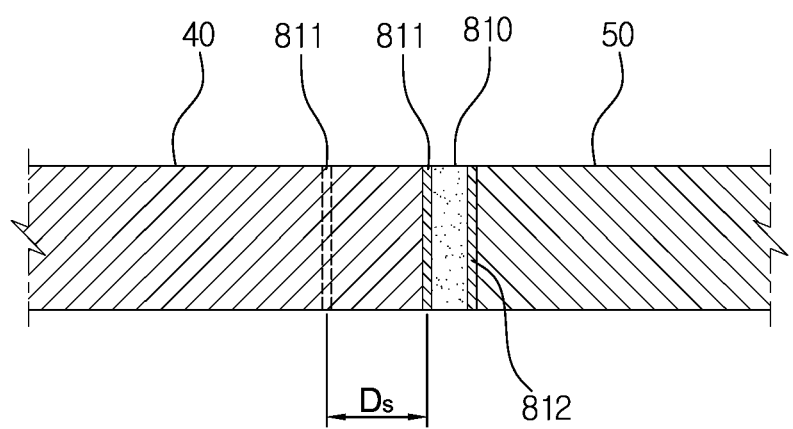

In contrast, as shown in FIG. 20B, in case that there is no lubricating oil 820 in the pressure chamber 810, when the driving force of the drive shaft 40 is applied to the first surface 811 of the pressure chamber 810, since the pressure chamber 810 is an empty space, the first surface 811 of the pressure chamber 810 moves toward the second surface 812. In this instance, when the stroke length of the drive shaft 40 by the operation of the camshaft corresponds to the distance between the first surface 811 and the second surface 812 of the pressure chamber 810, the driving force of the drive shaft 40 is not transmitted to the second surface 812 of the pressure chamber 810. Accordingly, even though the drive shaft 40 moves by the operation of the camshaft, the driving force of the drive shaft 40 is not transmitted to the piston 50, so the liquefied gas compression device does not operate and the liquefied gas is not discharged.

Figure 20C:
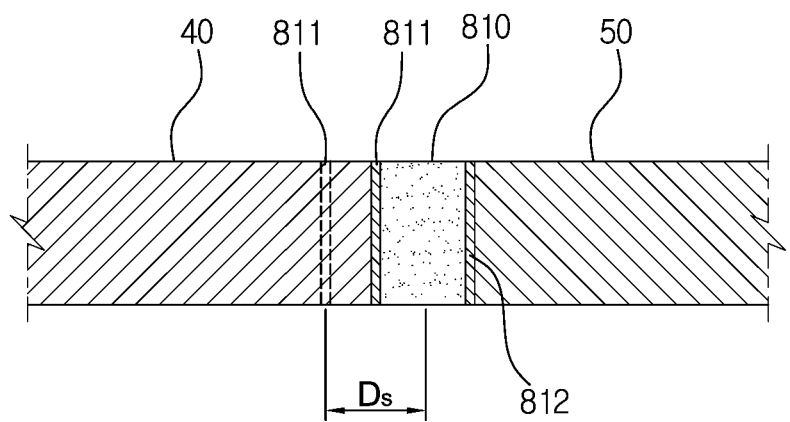

Lastly, describing the third case, as shown in FIG. 20C, in case that the pressure chamber 810 is filled with the lubricating oil and the lubricating oil supply passage 830 is open, when the driving force of the drive shaft 40 is applied to the first surface 811 of the pressure chamber 810, the lubricating oil in the pressure chamber 810 is discharged through the lubricating oil supply passage 830 and the first surface 811 moves toward the piston 50. In this instance, the movement distance of the first surface 811 may be controlled through the adjustment of the amount of lubricating oil discharged through the lubricating oil supply passage 830. That is, the movement distance of the first surface 811 is proportional to the amount of lubricating oil discharged from the pressure chamber 810 through the lubricating oil supply passage 830, and the stroke length of the piston may be controlled by adjusting the amount of lubricating oil discharged from the pressure chamber 810 through the lubricating oil supply passage 830.

As the driving force is not applied to the piston 50 by a length as much as the amount of discharge of lubricating oil in the pressure chamber 810 among the total stroke length Ds of the drive shaft 40, the piston 50 only moves to the remaining stroke length left after subtracting the length as much as the amount of lubricating oil in the pressure chamber 810 from the total stroke length Ds. As described above, with the decreasing stroke length of the piston 50, the amount of liquefied gas discharged through the liquefied gas compression device decreases compared to the normal one.

As described above, it is possible to stop the discharge of the liquefied gas by setting the condition of the pressure chamber 810 to empty, and it is possible to maintain the normal discharge of the liquefied gas by fully filling the pressure chamber 810 with the lubricating oil 820 to completely transmit the driving force of the drive shaft 40 to the piston 50, and together with this, it is possible to selectively control the amount of liquefied gas discharged from the liquefied gas compression device by adjusting the amount of lubricating oil discharged from the pressure chamber 810.

Meanwhile, the gas supply pump according to the present disclosure may include the plurality of pistons in one camshaft, and each piston may be independently driven through any one of the above-described first to third embodiments, the cutoff method or the above-described pressure chamber method.

The liquefied gas compression device connected to each piston discharges high pressure liquefied gas by the rotation of the camshaft, and the liquefied gas discharged through each liquefied gas compression device joins at an integrated outlet pipe, and finally, is supplied to an engine combustion chamber.

Figure 21:
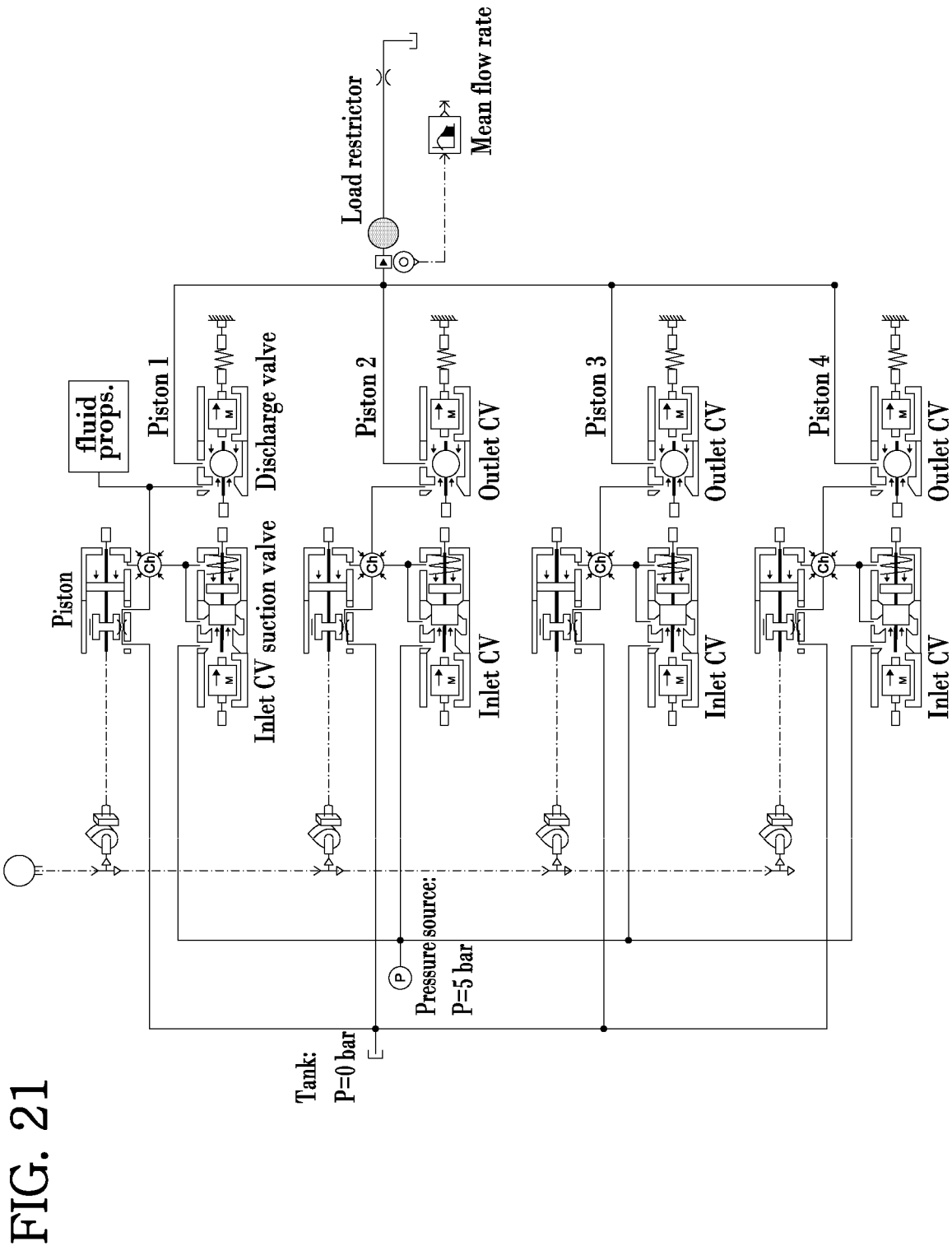
FIG. 21 is a system diagram of a gas supply pump.

In the supply of the liquefied gas to the engine combustion chamber through the integrated outlet pipe, the liquefied gas creates pulsation of discharge pressure (hereinafter referred to as 'discharge pressure pulsation') (see FIG. 21). The discharge pressure pulsation of the liquefied gas supplied to the engine combustion chamber through the integrated outlet pipe has the physical influence on the liquefied gas combustion efficiency and the engine. When the discharge pressure pulsation increases, the liquefied gas combustion efficiency reduces and physical impacts are applied to the engine.

The discharge pressure pulsation of the liquefied gas is related to the number of pistons connected to the camshaft and the phase of the cam nose to which the piston is connected. Experiments reveal that as the number of pistons in action increases, the discharge pressure pulsation reduces, and when the cam noses to which the pistons are connected are in equidistant phase, the discharge pressure pulsation reduces.

Figure 22:
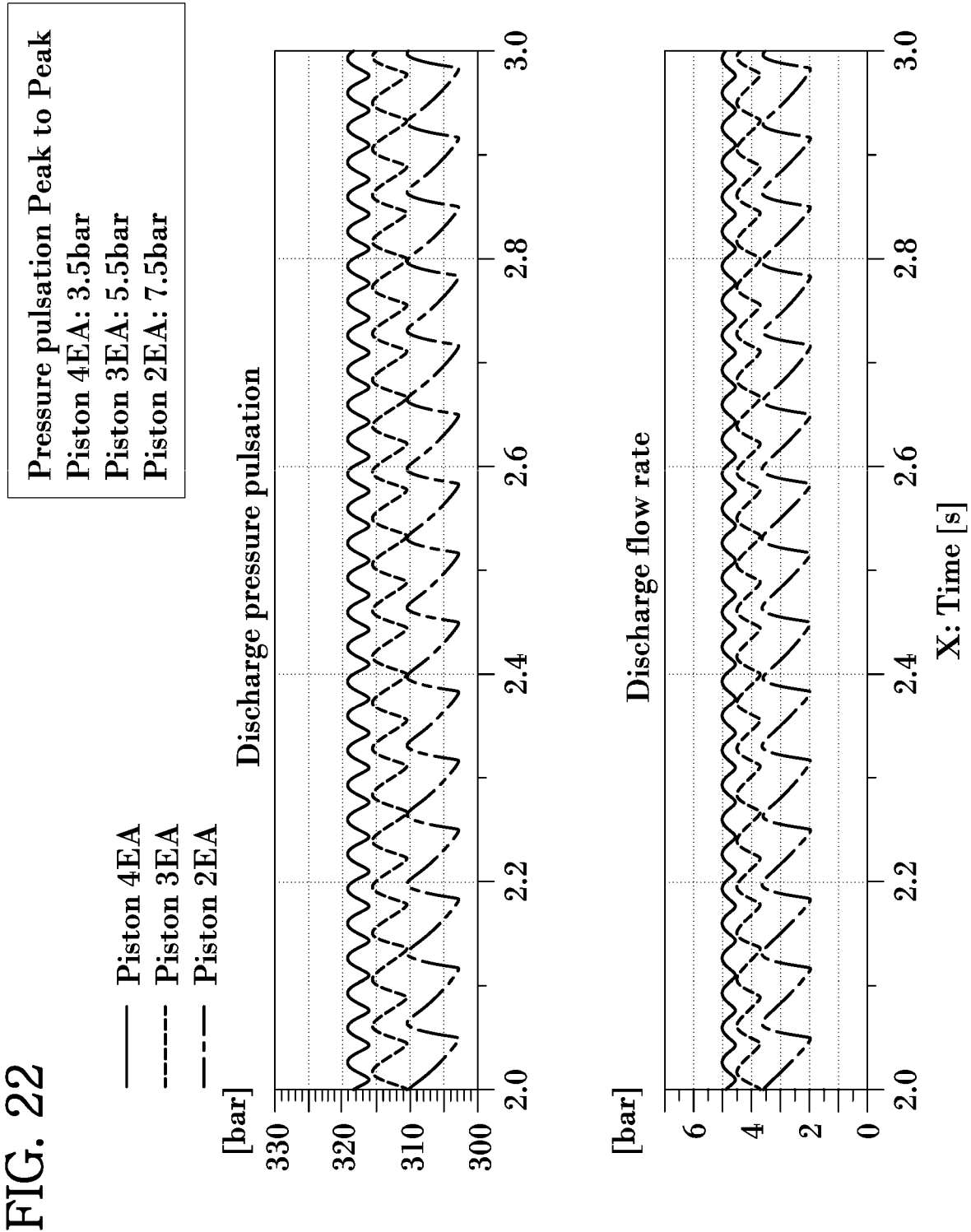
FIG. 22 is a graph showing discharge pressure pulsation as a function of the number of pistons.
Figure 23:
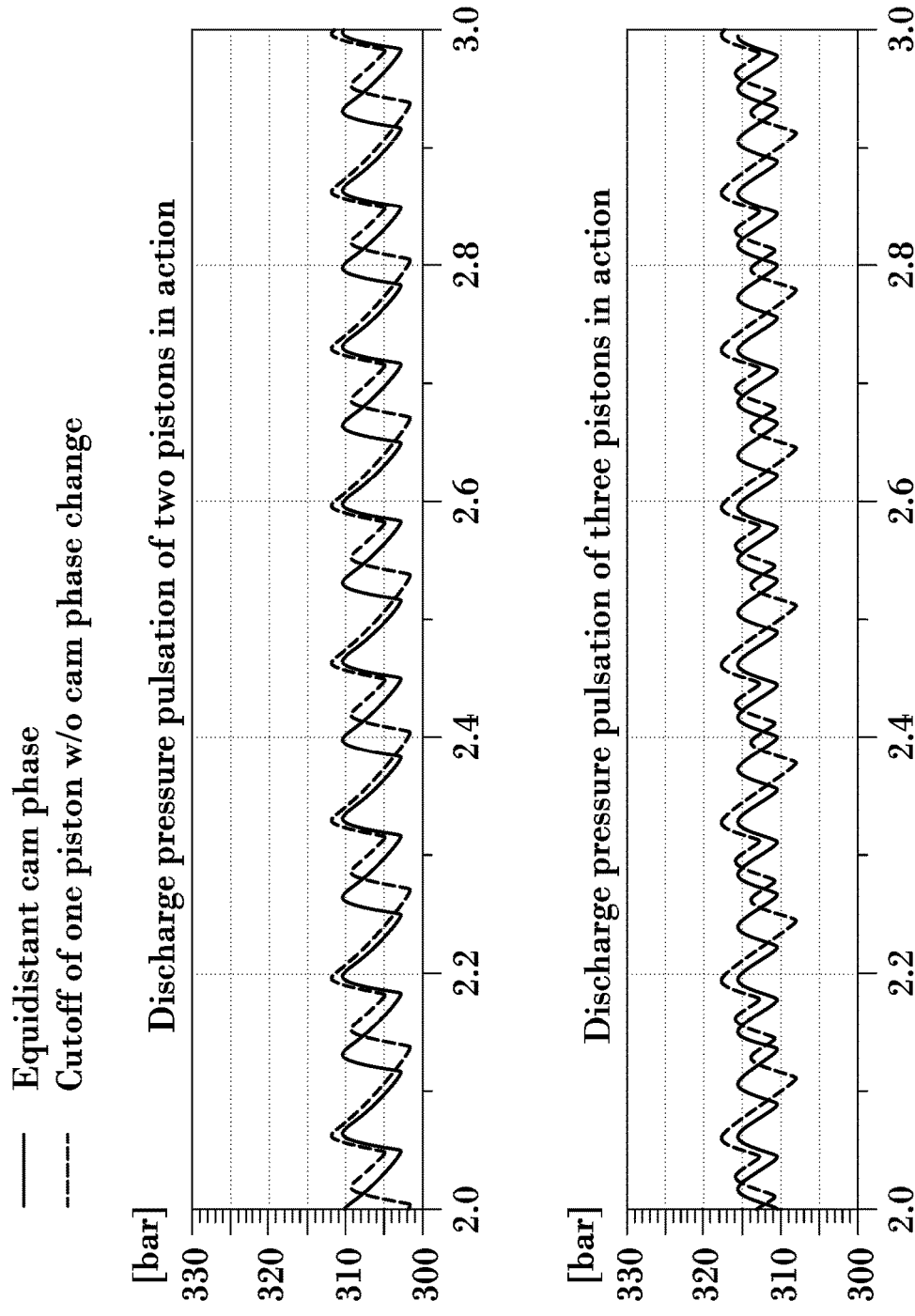
FIG. 23 is a graph showing discharge pressure pulsation as a function of cam nose phase.

FIGS. 22 and 23 show the experimental results of the discharge pressure pulsation as a function of the number of pistons and the cam nose phase. Referring to FIG. 22, in case that the number of pistons connected to the camshaft is 4, when the number of pistons in action is 2, the highest discharge pressure pulsation of 7.5 bar is found. In contrast, when the number of pistons in action is 3, the discharge pressure pulsation is 5.5 bar, and when the number of pistons in action is 4, the discharge pressure pulsation is 3.5 bar, so it can be seen that as the number of pistons in action increases, the discharge pressure pulsation reduces. This is because as the number of pistons in action increases, the discharge pressure pulsation of the liquefied gas compressed and discharged through each piston cancels out.

Additionally, referring to FIG. 23, it can be seen that in case that the cam noses are in equidistant phase and in case that one piston is cut off without a change in cam nose phase, both when the number of pistons in action is 2 and 3, the discharge pressure pulsation reduces in the equidistant phase of the cam noses. Specifically, while when the number of pistons in action is 3 and the cam noses are in equidistant phase, the discharge pressure pulsation is 5.5 bar, when one piston is cut off to operate three pistons without a change in cam nose phase, the discharge pressure pulsation increases to 10 bar. Additionally, while when the number of pistons in action is 2 and the cam noses are in equidistant phase, the discharge pressure pulsation is 7.5 bar, when one piston is cut off to operate two pistons without a change in cam nose phase, the discharge pressure pulsation increases to 10 bar.

As can be seen from the foregoing, as the number of pistons connected to the operation of the camshaft increases and when the cam noses are in equidistant phase, it is possible to reduce the discharge pressure pulsation.

Additionally, it can be seen through the above-described experimental results that it is possible to adjust the discharge pressure pulsation through the number of pistons and the cam nose phase placement. In an embodiment, the number of pistons in action and the cam nose phase may be placed considering the allowable range of discharge pressure pulsation. For example, when the upper limit of the allowable range of discharge pressure pulsation is equal to or less than 8 bar, the cam noses are in equidistant phase and the minimum number of pistons in action is 2.

| Description of Reference Numbers | |
|---|---|
| 10: Camshaft | 20: Cam nose |
| 30: Cam roller | 40: Drive shaft |
| 50: Piston | 50a: Suction valve outlet pipe |
| 51a: Spring member seating groove | 51b: Guide ring seating groove |
| 52: Piston cover | |
| 60: Suction valve | 61: Opening/closing member |
| 62: Liquefied gas inlet port | 63: Spring member |
| 70: Discharge valve | 71: Discharge chamber |
| 72: Auxiliary chamber | 73: Discharge inlet pipe |
| 74: Discharge chamber top side space | 75: Spring member |
| 80: Cylinder | |
| 110: Integral connection member | 111: Cutoff bolt insertion groove |
| 112: Cam roller spacing guide groove | 120: Compression spring |
| 130: Cam roller-drive shaft case | 131: cutoff bolt through-hole |
| 132: Cutoff pin through-hole | 140: Cutoff bolt |
| 210: First seating portion | 220: Second seating portion |
| 230: Inertia moment damping member | 240: Stopper |
| 250: Clamp | 310: Liquefied gas supply port |
| 320: Liquefied gas supply passage | 410: Spring member |
| 420: Guide ring | 510: Guide ring |
| 520: Rod seal | 530: Wiper seal |
| 610: Cutoff pin guide member | 611: Cutoff pin guide groove |
| 620: Cutoff pin | 621: Cutoff pin guide pin |
| 622: Cam roller spacing protrusion | 710: Coupling case |
| 720: Rack member | 730: Pinion |
| 740: Pinion guide member | |

The invention claimed is:

1. A gas supply pump for a ship dual fuel engine, comprising:
    a rotatable camshaft, the rotatable camshaft comprising a plurality of cam noses arranged eccentric from a center of the rotatable camshaft at regular intervals along a lengthwise direction of the rotatable camshaft; and
    a plurality of liquefied gas compression devices arranged at regular intervals along the lengthwise direction of the rotatable camshaft, wherein each liquefied gas compression device of the plurality of liquefied gas compression devices is configured to compress and discharge liquefied gas, and wherein each liquefied gas compression device of the plurality of liquefied gas compression devices comprises:
        a cam roller configured to closely contact a respective cam nose of the plurality of cam noses;
        a drive shaft on one side of the cam roller;
        a piston adjacent to the drive shaft on the one side of the cam roller;
        an integral connection member connected to the cam roller, the integral connection member comprising a receiver; and
        a case that houses the cam roller, the drive shaft, piston, and the integral connection member, the case comprising a through hole that is at least partially aligned with the receiver of the integral connection member,
    wherein each of the plurality of liquefied gas compression devices is configured such that, when a cutoff bolt or a cutoff pin is inserted through the through hole and connected to the receiver, the cam roller is spaced apart from the cam nose to thereby prevent transmission of a rotational driving force of the cam nose to the piston.

2. The gas supply pump for a ship dual fuel engine according to claim 1, wherein a plurality of the drive shafts are arranged side by side in a direction perpendicular to one camshaft, and the cam roller is disposed between the cam nose and the drive shaft of the camshaft.

3. The gas supply pump for a ship dual fuel engine according to claim 1, wherein a center of rotation of the cam nose is the same as a center of rotation of the camshaft, a radius of the cam nose is smaller than a radius of the camshaft, a radius of rotation of the cam nose corresponds to a radius of rotation of the camshaft, and when the camshaft rotates, the cam roller in close contact with the cam nose makes a linear reciprocating motion within a predetermined distance.

4. The gas supply pump for a ship dual fuel engine according to claim 1, wherein when the cam nose is located at a 90° angle on the basis of a vertical direction by the rotation of the camshaft, the cam roller moves the compression direction of the piston, and when the cam nose is located at a 270° angle by the rotation of the camshaft, the cam roller moves in the decompression direction of the piston.

5. The gas supply pump for a ship dual fuel engine according to claim 1, wherein:
    each of the plurality of liquefied gas compression devices further comprises a compression spring disposed around the drive shaft, and
    each of the plurality of liquefied gas compression devices is configured such that:
        the cam roller is seated at one end of the integral connection member,
        the drive shaft is mounted at an other end of the integral connection member,
        the compression spring is fixed to an inner side of the integral connection member, and
        the cam roller and the integral connection member are configured such that, when the rotatable camshaft rotates with the cam roller in close contact with the respective cam nose, the cam roller and the integral connection member make a linear reciprocating motion together.

6. The gas supply pump for a ship dual fuel engine according to claim 1, wherein a first seating portion and a second seating portion which form a predetermined space at one end of the drive shaft are provided at a coupled part of the drive shaft and the piston, and the first seating portion is disposed in an inner direction of the drive shaft and the second seating portion is disposed in an outer direction of the drive shaft, and
    wherein an inertia moment damping member is disposed in the first seating portion, and one exposed surface of the inertia moment damping member is in close contact with the piston.

7. The gas supply pump for a ship dual fuel engine according to claim 6, wherein a diameter of the second seating portion is larger than a diameter of the first seating portion, and the diameter of the first seating portion corresponds to a diameter of the piston, and
    wherein a stopper is filled between a space between the second seating portion and the piston, and the stopper is in close contact with the piston and an inner diameter of the second seating portion to prevent the piston from rotating.

8. The gas supply pump for a ship dual fuel engine according to claim 6, wherein a clamp is provided at the coupled part of the drive shaft and the piston to protect the corresponding coupled part.

9. The gas supply pump for a ship dual fuel engine according to claim 1, wherein the liquefied gas compression device includes:
a liquefied gas supply passage in which the liquefied gas to be compressed is supplied to a suction valve,
the suction valve configured to suck the liquefied gas from the liquefied gas supply passage, and supply the sucked liquefied gas to a discharge valve when pressure of the piston is applied, and
the discharge valve configured to discharge the liquefied gas supplied from the suction valve in a compressed state.

10. The gas supply pump for a ship dual fuel engine according to claim 9, wherein one end of the liquefied gas supply passage is connected to a liquefied gas supply port on one side of the gas supply pump, and the other end is connected to a liquefied gas inlet port on one side of the suction valve, and
wherein the liquefied gas to be compressed is supplied to an internal space of the suction valve through the liquefied gas inlet port via the liquefied gas supply port and the liquefied gas supply passage.

11. The gas supply pump for a ship dual fuel engine according to claim 9, wherein an opening/closing member is provided around the suction valve to selectively open/close the liquefied gas inlet port, and the opening/closing member is connected to a spring member around a bottom circumference of the suction valve and makes a linear reciprocating motion by compression and restoration of the spring member,
wherein when the opening/closing member moves in the compression direction by the compression of the spring member, the liquefied gas inlet port is opened, and when the opening/closing member moves in the restoration direction by the restoration of the spring member, the liquefied gas inlet port is closed, and
wherein when the liquefied gas is supplied through the liquefied gas supply passage with the liquefied gas inlet port closed by the opening/closing member, the opening/closing member moves in the compression direction of the spring member by supply pressure of the liquefied gas, the liquefied gas inlet port is opened, and the liquefied gas is supplied to the internal space of the suction valve.

12. The gas supply pump for a ship dual fuel engine according to claim 9, wherein the discharge valve is disposed in a discharge chamber,
wherein a spring member is provided at a lower end of the discharge valve and allows the discharge valve to make a linear reciprocating motion by compression and restoration of the spring member,
wherein an auxiliary chamber of a predetermined space is provided around a top circumference of the discharge chamber, and a discharge inlet pipe is provided between the auxiliary chamber and the discharge valve, and
wherein the liquefied gas discharged from the suction valve is supplied to the discharge valve via the auxiliary chamber and the discharge inlet pipe in a sequential order.

13. A gas supply pump for a ship dual fuel engine, comprising:
a rotatable camshaft, the rotatable camshaft comprising a plurality of cam noses arranged eccentric from a center of the rotatable camshaft at regular intervals along a lengthwise direction of the rotatable camshaft; and
a plurality of liquefied gas compression devices arranged at regular intervals along the lengthwise direction of the rotatable camshaft, wherein each liquefied gas compression device of the plurality of liquefied gas compression devices is configured to compress and discharge liquefied gas, and wherein each liquefied gas compression device of the plurality of liquefied gas compression devices comprises:
a cam roller configured to closely contact a respective cam nose of the plurality of cam noses;
a drive shaft on one side of the cam roller;
a piston adjacent to the drive shaft on the one side of the cam roller;
an integral connection member that integrally connects the cam roller and the drive shaft, wherein the cam roller is seated at one end of the integral connection member and the drive shaft is mounted at an other end of the integral connection member;
a compression spring disposed around the drive shaft and fixed to an inner side of the integral connection member; and
a cam roller-drive shaft case on an outer side of the integral connection member to protect the integral connection member and to guide movement of the integral connection member, wherein the cam roller-drive shaft case comprises, on one side, a cutoff bolt through-hole into which a cutoff bolt is configured to be inserted and passed through, and the integral connection member comprises, on one side, a cutoff bolt insertion groove, into which the cutoff bolt is configured to be inserted to a predetermined depth, wherein:
each of the plurality of liquefied gas compression devices is configured such that:
the piston is compressed when the rotatable camshaft rotates the respective cam nose in a compression direction of the piston,
the piston is decompressed when the rotatable camshaft rotates the respective cam nose in a decompression direction of the piston,
the cam roller is selectively spaced apart from the respective cam nose and, when the cam roller and the respective cam nose are spaced apart from each other, a rotational driving force of the respective came nose is not transmitted to the piston,
the cam roller and the integral connection member are configured such that, when the rotatable camshaft rotates with the cam roller in close contact with the respective cam nose, the cam roller and the integral connection member make a linear reciprocating motion together, and
the respective cam nose and the cam roller are configured to be spaced apart from each other when the cutoff bolt is inserted into the cutoff bolt insertion groove through the cutoff bolt through-hole.

14. The gas supply pump for a ship dual fuel engine according to claim 13, wherein:
a center of the cutoff bolt through-hole and a center of the cutoff bolt insertion groove are offset from each other,
the center of the cutoff bolt insertion groove is located at a slightly lower position than the center of the cutoff bolt through-hole, and
the cutoff bolt insertion groove has a tapered shape having a decreasing radius with increasing depth, and has a difference between radii at an entrance and a lower surface of the cutoff bolt insertion groove by the tapered shape.

15. The gas supply pump for a ship dual fuel engine according to claim 13, wherein, when the cutoff bolt is inserted through the cutoff bolt through-hole into the cutoff bolt insertion groove:
the cutoff bolt contacts a side of the cutoff bolt insertion groove having a tapered shape and moves inward of the cutoff bolt insertion groove along the side of the cutoff bolt insertion groove, and
as the cutoff bolt moves inward of the cutoff bolt insertion groove, the integral connection member moves up, and the cam roller is spaced apart from the respective cam nose.

16. The gas supply pump for a ship dual fuel engine according to claim 5, further comprising:
a cam roller-drive shaft case on an outer side of the integral connection member to protect the integral connection member and guide the movement of the integral connection member,
wherein a hollow cylindrical cutoff pin guide member is provided on one side of the cam roller-drive shaft case, and the cutoff pin is inserted into the cutoff pin guide member such that the cutoff pin can move up or down,
wherein the cutoff pin guide member has a cutoff pin guide groove on one side, and the cutoff pin guide groove includes a vertical guide groove and a horizontal guide groove spatially connected to each other, the vertical guide groove is extended from a first point to a second point on a vertical line, and the horizontal guide groove is extended from the second point of the vertical guide groove to a third point in a horizontal direction,
wherein a cutoff pin guide pin is provided on one side of the cutoff pin, and is disposed in the cutoff pin guide groove,
wherein when the cutoff pin guide pin vertically moves from the first point of the cutoff pin guide groove to the second point, the cutoff pin moves down by a corresponding distance, and when the cutoff pin guide pin horizontally moves from the second point of the cutoff pin guide groove to the third point, the cutoff pin rotates by an angle between the second point and the third point,
wherein the cutoff pin has, on a lower surface, a cylindrical cam roller spacing protrusion having a smaller radius than the cutoff pin, and a center of the cam roller spacing protrusion is eccentric from a center of a circle of the cutoff pin, and
wherein when the cutoff pin guide pin horizontally moves from the second point of the cutoff pin guide groove to the third point, the cam roller spacing protrusion on the lower surface of the cutoff pin rotates at a predetermined angle.

17. The gas supply pump for a ship dual fuel engine according to claim 16, wherein the cam roller-drive shaft case has, on one side, a cutoff pin through-hole into which the cutoff pin is inserted and passed through, and the integral connection member has a cam roller spacing guide groove corresponding to the cutoff pin through-hole,
wherein when the cutoff pin guide pin is located at the second point, the cam roller spacing protrusion at the lower end of the cutoff pin is disposed in the cam roller spacing guide groove of the integral connection member, and the cam roller spacing protrusion is in non-contact with the integral connection member in the cam roller spacing guide groove,
wherein when the cutoff pin protrusion moves from the second point of the cutoff pin guide groove to the third point, the cutoff pin horizontally rotates, and the cam roller spacing protrusion horizontally rotates and physically pushes and moves the integral connection member, and
wherein the cam roller and the cam nose are spaced apart from each other by the movement of the integral connection member by the cam roller spacing protrusion.

18. The gas supply pump for a ship dual fuel engine according to claim 1, further comprising:
a pressure chamber between the drive shaft and the piston to selectively apply a driving force of the drive shaft to the piston,
wherein an amount of the liquefied gas discharged from the liquefied gas compression device is controlled by adjusting an amount of lubricating oil in the pressure chamber,
wherein a first surface of the pressure chamber contacts the drive shaft, and a second surface of the pressure chamber contacts the piston, and
wherein the first surface of the pressure chamber can move by the driving force of the drive shaft, and the pressure chamber changes in volume by the movement of the first surface.

19. The gas supply pump for a ship dual fuel engine according to claim 18, wherein in case that the pressure chamber is fully filled with the lubricating oil,
when the driving force of the drive shaft is applied to the first surface of the pressure chamber, the driving force of the drive shaft is applied to the piston via the lubricating oil filled in the pressure chamber, and pressure of the piston is transmitted to the liquefied gas compression device and the discharge of the liquefied gas is performed,
wherein in case that there is no lubricating oil in the pressure chamber,
when the driving force of the drive shaft is applied to the first surface of the pressure chamber, since the pressure chamber is an empty space, the first surface of the pressure chamber moves toward the second surface, and when a stroke length of the drive shaft by the operation of the camshaft is smaller than a length between the first surface and the second surface of the pressure chamber, the driving force of the drive shaft is not transmitted to the second surface of the pressure chamber, and the discharge of the liquefied gas by the liquefied gas compression device is not performed, and
wherein in case that the pressure chamber is filled with the lubricating oil, and the lubricating oil in the pressure chamber can be discharged through a lubricating oil supply passage,
when the driving force of the drive shaft is applied to the first surface of the pressure chamber, the lubricating oil in the pressure chamber is discharged, the first surface moves by an amount of the discharged lubricating oil, the driving force is not applied to the piston by a length as much as the amount of discharge of the lubricating oil in the pressure chamber among a total stroke length (Ds) of the drive shaft, and the piston only moves to a remaining stroke length left after subtracting the length as much as the amount of discharge of the lubricating oil in the pressure chamber from the total stroke length (Ds).

* * * * *